(12) United States Patent
Iwaki et al.

(10) Patent No.: US 6,938,473 B2
(45) Date of Patent: Sep. 6, 2005

(54) APPARATUS FOR MEASURING FLOW AMOUNT

(75) Inventors: Takao Iwaki, Chiryu (JP); Toshiyuki Morishita, Iwakukra (JP); Yasushi Kohno, Nagoya (JP); Hiroyuki Wado, Toyota (JP); Yasushi Goka, Kariya (JP); Makoto Tsunekawa, Okazaki (JP); Toshirou Gotou, Kariya (JP); Kiyoyuki Sugiura, Okazaki (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/298,230

(22) Filed: Nov. 18, 2002

(65) Prior Publication Data

US 2003/0094041 A1 May 22, 2003

(30) Foreign Application Priority Data

Nov. 19, 2001 (JP) .................................. 2001-353605
Dec. 11, 2001 (JP) .................................. 2001-377784
Apr. 18, 2002 (JP) .................................. 2002-116077
Sep. 20, 2002 (JP) .................................. 2002-275680

(51) Int. Cl.$^7$ ................................................ G01F 1/68
(52) U.S. Cl. .................................................. 73/204.21
(58) Field of Search ........................ 73/204.21, 204.22, 73/204.19

(56) References Cited

U.S. PATENT DOCUMENTS 4,457,169 A * 7/1984 Lauterbach et al. ........ 73/202.5
4,981,035 A * 1/1991 Hall ............................ 73/118.2
5,220,830 A * 6/1993 Bonne ....................... 73/204.21
5,454,859 A * 10/1995 Chiba et al. .................... 96/18
5,942,683 A * 8/1999 Aoi et al. ................... 73/202.5
6,079,264 A 6/2000 Yamakawa et al.
6,085,587 A * 7/2000 Konzelmann ................ 73/202
6,112,590 A * 9/2000 Rilling ..................... 73/204.21
6,332,356 B1 12/2001 Hecht et al.
6,336,360 B1 * 1/2002 Weber ...................... 73/204.21
6,595,049 B1 * 7/2003 Maginnis et al. .......... 73/202.5

FOREIGN PATENT DOCUMENTS

| JP | 05-312064 | 11/1993 |
| JP | 06-026903 | 2/1994 |
| JP | 2000-304585 | 11/2000 |
| JP | 2001-33288 | 2/2001 |
| JP | 2001-174305 | 6/2001 |

* cited by examiner

Primary Examiner—Edward Lefkowitz
Assistant Examiner—Jewel V. Thompson
(74) Attorney, Agent, or Firm—Nixon & Vanderhye PC

(57) ABSTRACT

An airflow meter has a membrane type sensor element. The sensor element is supported on a support member so that a sensing surface of the sensor element is in parallel to the airflow direction. The airflow meter has at least one means for protecting the sensor element from dust such as foreign particles. The protecting means is provided with an obstruction member that is disposed upstream or downstream of the sensor element with respect to the airflow direction. The sensor element is hidden behind the obstruction member. The obstruction member has gradually spreading surfaces and gradually converging surfaces along the airflow direction. Alternatively, the protecting means can be provided with a deflector, a cover member, a flow guide member, an inlet or a dust collector.

32 Claims, 40 Drawing Sheets

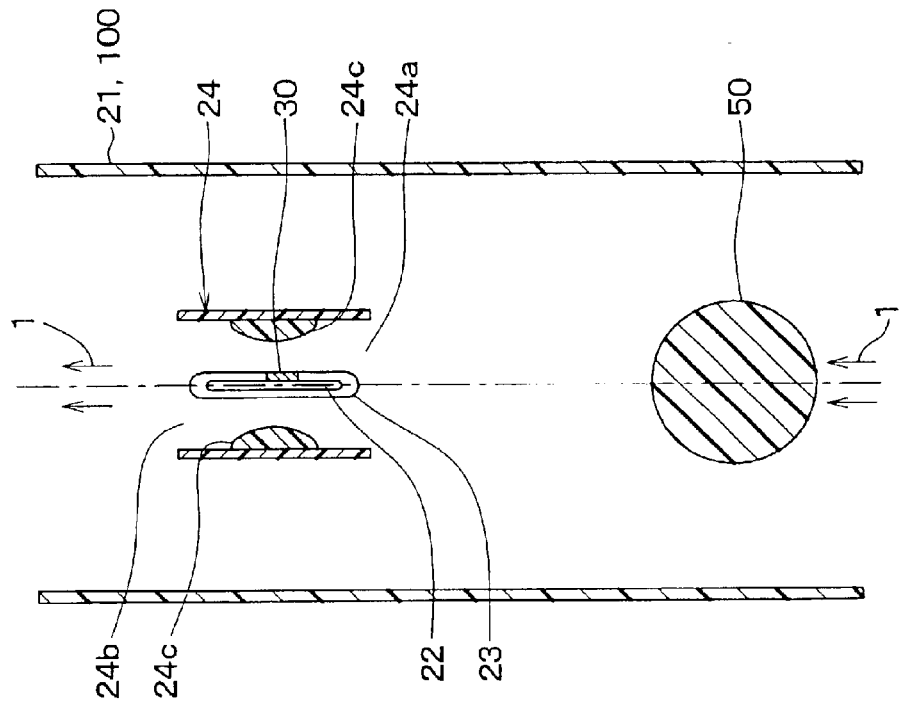
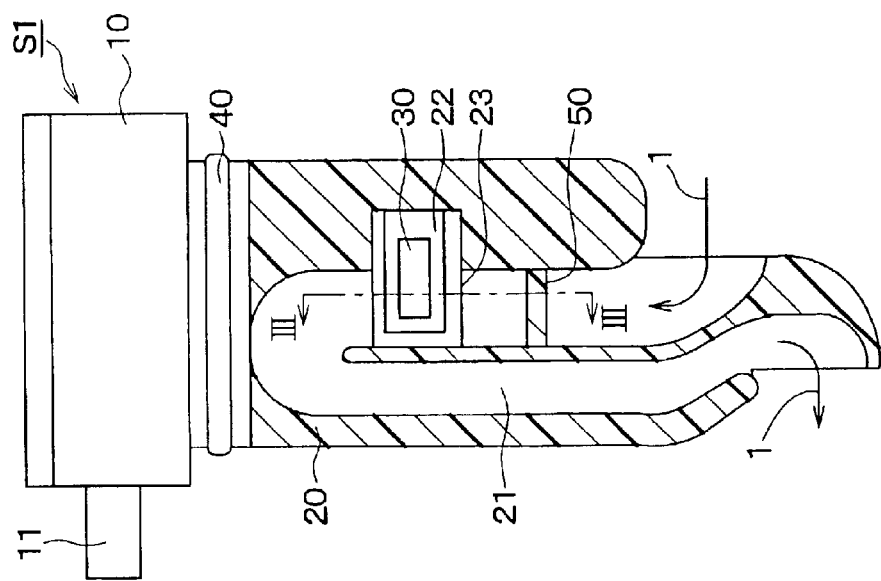

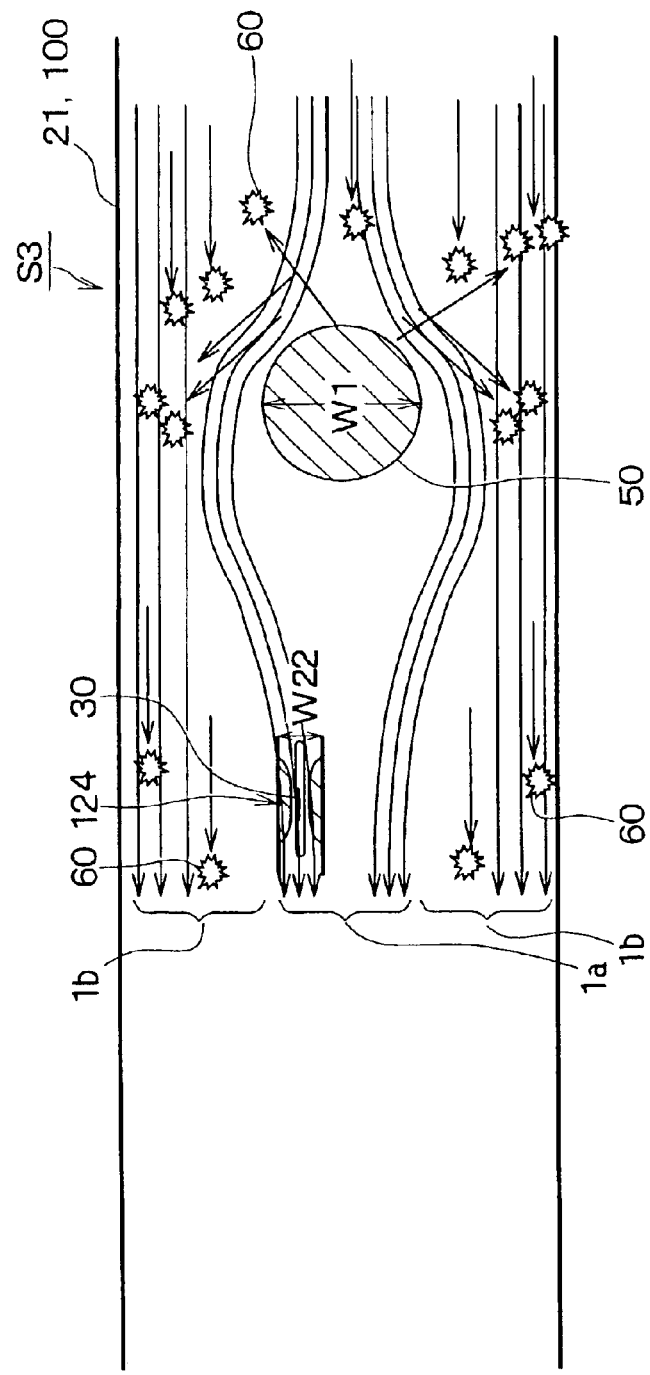

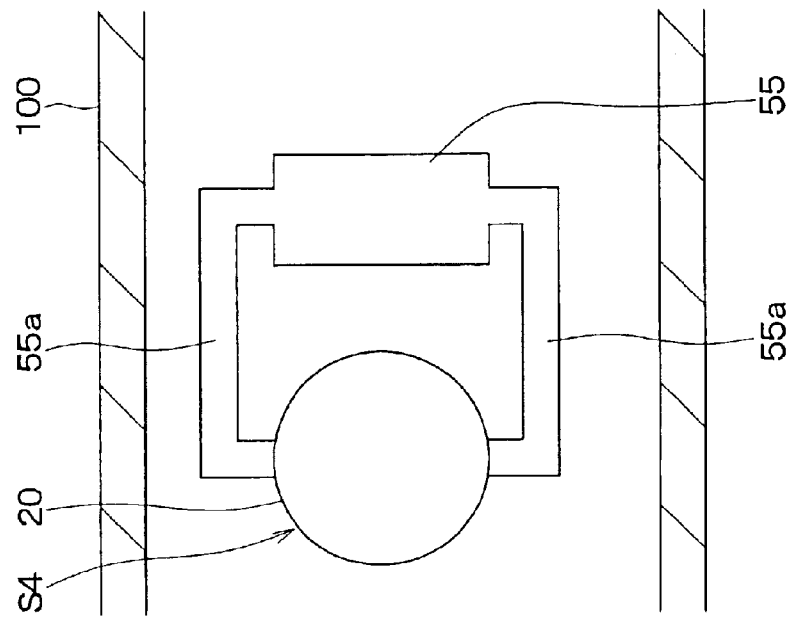
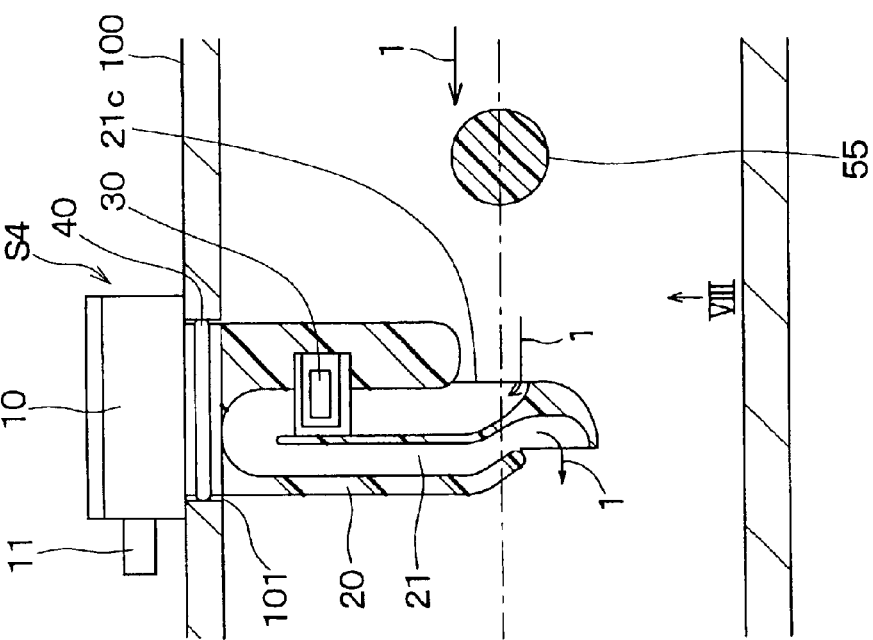

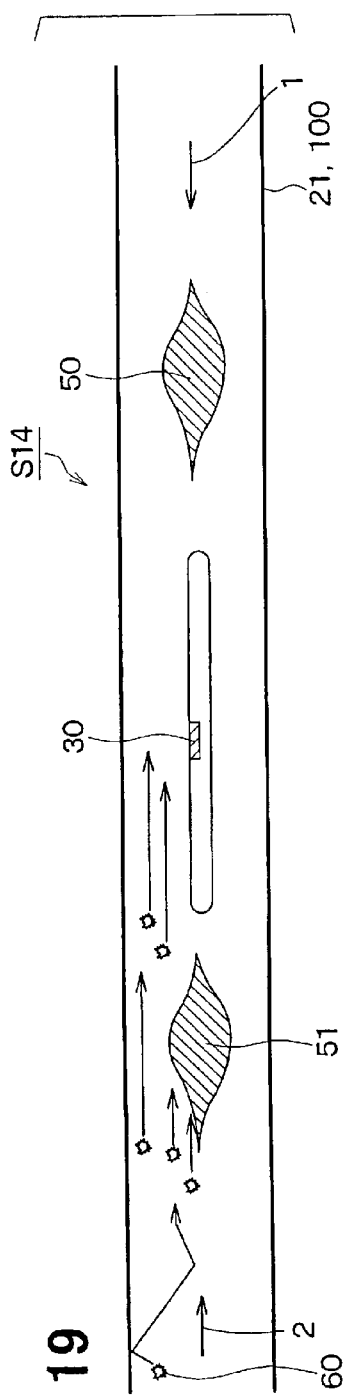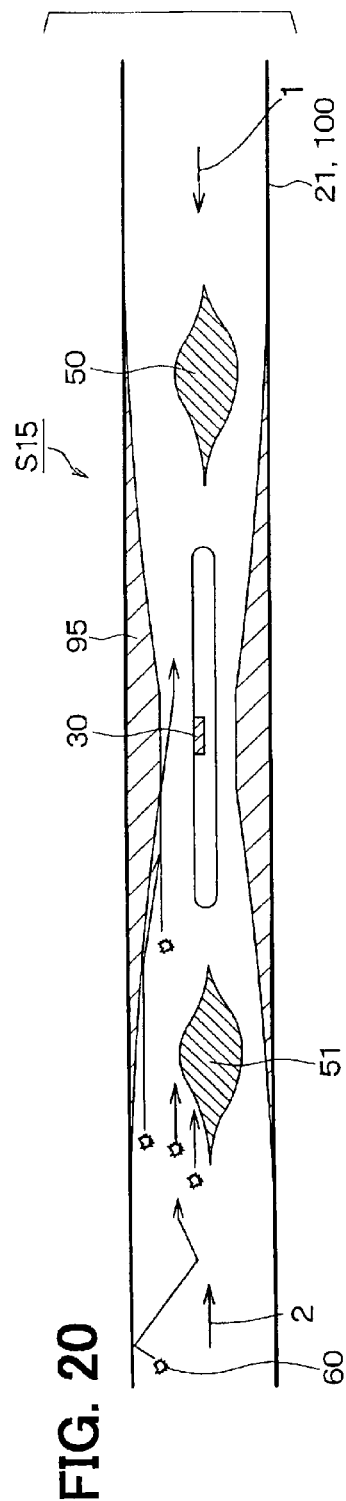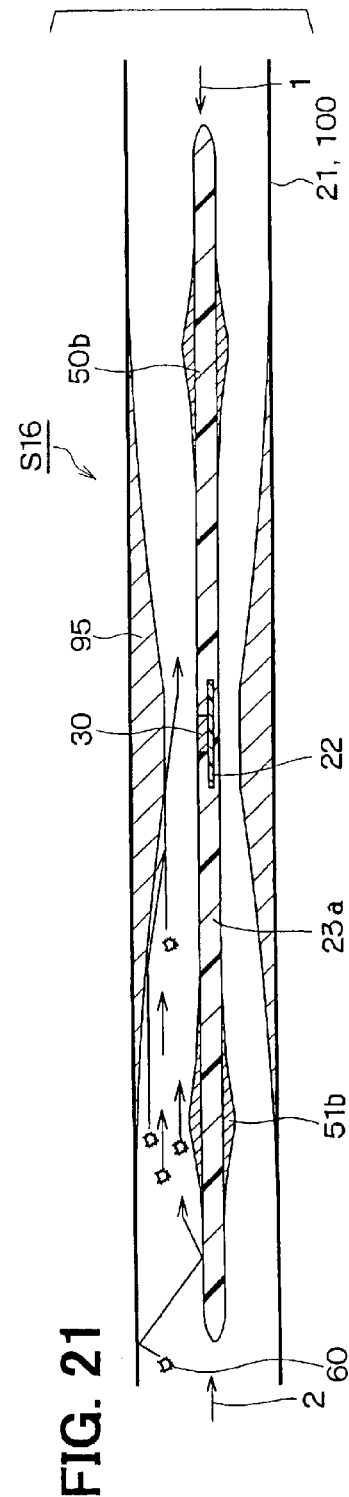

APPARATUS FOR MEASURING FLOW AMOUNT

CROSS REFERENCE TO RELATED APPLICATION

This application is based on Japanese Patent Applications No. 2001-353605 filed on Nov. 19, 2001, No. 2001-377784 filed on Dec. 11, 2001, No. 2002-116077 filed on Apr. 18, 2002, and No. 2002-275680 filed on Sep. 20, 2002 the contents of which are incorporated herein by reference.

BACKGROUND OF THE INVENTION

1. Field of the Invention

The present invention relates to an apparatus for measuring a flow amount of a medium.

2. Description of Related Art

An apparatus for measuring a flow amount of a medium is used for several industrial fields. For example, the apparatus is used for measuring a flow amount of gaseous fluid such as air flowing in an intake pipe of an internal combustion engine or flowing toward a burner, and gas flowing through a gas meter for metering amount of gas consumption. The apparatus is also used for measuring a flow amount of liquid fluid.

In such the apparatus, it is important to protect a sensing element from dust such as foreign particles, sand, contaminants, oily or greasy adhesive particles and micro carbon particles.

For example, U.S. Pat. No. 6,332,356 (DE 19815654A1) discloses an air flow meter for an internal combustion engine. The disclosed air flow meter has divided air conduits for separating dust from the sensing element. JP-2001-174305-A also discloses an air flow meter for an internal combustion engine. The disclosed air flow meter has divided air conduits.

JP-A-2001-33288 discloses an air flow meter for an internal combustion engine. The disclosed air flow meter has a short-circuit path for bypassing dust.

JP-A-2000-304585 discloses an air flow meter for an internal combustion engine. The disclosed air flow meter has louvers upstream of the sensor element.

Although the several techniques are tried and proposed, sufficient protection for the sensing element is still not obtained.

SUMMARY OF THE INVENTION

It is therefore an object of the present invention to provide an apparatus for measuring a flow amount of medium being capable of protecting a sensing element from dust.

According to a first aspect of the present invention, an apparatus for measuring flow amount of medium has a sensor element. The sensor element is located in a sensing passage. An obstruction member is located upstream or downstream of the sensing passage with respect to a flow direction. The obstruction member provides a projected area that is larger than an inlet of the sensing passage. The obstruction member has a smooth surface along a flow direction of the medium. The obstruction member is formed and located so that the inlet is completely hidden behind the obstruction member with respect to the flow direction of the medium. The obstruction member enables that the sensing passage introduces medium. The obstruction member directs the dust away from the inlet of the sensing passage.

The sensor element may be supported in a bypass passage instead of the sensing passage.

According to a second aspect of the present invention, an obstruction member is disposed upstream of a sensor element supported in a passage. The obstruction member has a smooth surface along a flow direction of the medium. The sensor element is completely hidden behind the obstruction member with respect to the flow direction of the medium. The obstruction member directs the dust away from the sensor element.

The obstruction member may be located downstream of the sensor element, and may be located both upstream and downstream of the sensor element. The obstruction member may be formed and located to define an inclination angle (θ) not less than 5 degrees. The inclination angle is defined between a surface of the sensor element and a tangential line (L1) on the obstruction member passing through the surface of the sensor element.

According to a third aspect of the present invention, a dust collector is located upstream of a sensor element. The dust collector has an ionizing section and a collecting section. The dust collector prevents the dust from reaching to the sensor element.

According to a fourth aspect of the present invention, a sensor element is disposed in the bypass passage. A dust preventing means for preventing dust from entering into an inlet of the bypass passage is located upstream of the inlet of the bypass passage so that a part or entirety of the inlet is hidden behind the dust preventing means.

According to a fifth aspect of the present invention, a sensor element is disposed in the bypass passage. The bypass passage has an inlet and an outlet which are opened toward a direction perpendicular to a flow direction of medium in a main passage.

According to a sixth aspect of the present invention, a sensor element is disposed in a passage. A flow guide member is located immediately upstream of the sensor element. The flow guide member has a surface substantially parallel to the flow direction of the medium. The flow guide member guides the flowing medium to protect the sensor element from the dust.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 2 is an enlarged cross sectional view of the airflow meter according to the first embodiment of the present invention;

FIG. 3 is an enlarged cross sectional view of the airflow meter taken along III—III line of FIG. 2 according to the first embodiment of the present invention;

FIG. 6 is a schematic cross sectional view of an airflow meter showing behavior of foreign particles according to a third embodiment of the present invention;

FIG. 7 is a partial cross sectional view of an airflow meter according to a fourth embodiment of the present invention;

FIG. 8 is a bottom view of the airflow meter according to the fourth embodiment of the present invention;

FIG. 19 is a schematic cross sectional view of an airflow meter showing behavior of foreign particles according to a fourteenth embodiment of the present invention;

FIG. 20 is a schematic cross sectional view of an airflow meter showing behavior of foreign particles according to a fifteenth embodiment of the present invention;

FIG. 21 is a schematic cross sectional view of an airflow meter showing behavior of foreign particles according to a sixteenth embodiment of the present invention;

DETAILED DESCRIPTION OF PREFERRED EMBODIMENTS

In embodiments described below, the present invention is implemented as an airflow meter for an internal combustion engine. The airflow meter is an apparatus for measuring flow amount of medium. The airflow meter measures an amount of air flowing through an intake pipe and outputs signal indicative of a detected amount of air. The airflow meter supplies the output signal to an electronic engine control unit to work as a sensor for an engine control system.

First Embodiment

Figure 1:
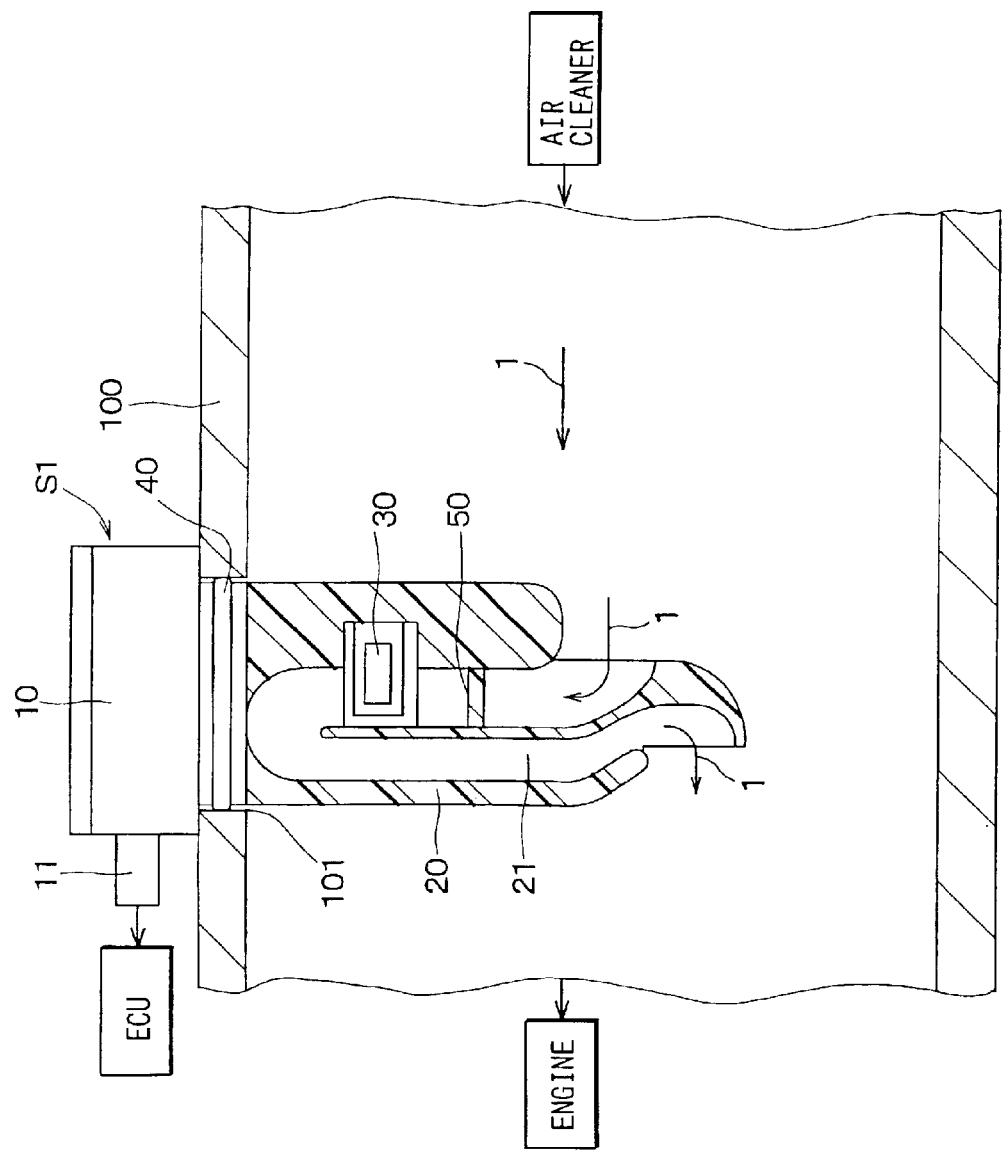
FIG. 1 is a partial cross sectional view of an airflow meter according to a first embodiment of the present invention.

Referring to FIGS. 1, 2 and 3, an intake pipe 100 is disposed between an air cleaner and the engine. The intake pipe 100 defines a main passage in which intake air flows. An arrow symbol 1 indicates forward direction of main airflow. In certain operating condition of the engine, reverse flow may be generated in the intake pipe 100. The intake air is filtered in the air cleaner, but it still contains dust such as foreign particles. The intake pipe 100 has an insertion hole 101 for receiving the airflow meter S1.

The airflow meter S1 is formed in a columnar shape to make it easy to handle and manipulate for inserting into the intake pipe 100 through the insertion hole 101. The airflow meter S1 has a circuit section 10, a passage member 20 and a sensor element 30. The circuit section 10 is formed in a flange shape to be located on an outside the intake pipe 100. The circuit section contains an electronic circuit such as an output amplifier and a driver circuit for the sensor element 30. The circuit section 10 has a connector 11 for providing an electrical connection to the engine control unit.

The passage member 20 is formed in generally columnar shape to be inserted and protruded into the intake pipe 100. A sealing member 40 such as an O ring is disposed between the insertion hole 101 and the passage member 20. The passage member 20 defines a bypass passage 21. The bypass passage 21 has a rectangular cross section. The bypass passage 21 is formed in generally inverted U-shape or omega ($\Omega$)-shape. The bypass passage 21 has an inlet facing upstream, an upstream straight path, a turn path, a downstream straight path and an outlet facing down stream. As a result, a part of air flowing in the main passage is introduced into the bypass passage 21. The bypass passage 21 is designed so that air amount flowing in the bypass passage 21 represents air amount flowing in the main passage.

The upstream straight path of the bypass passage 21 has a sensing portion in which the sensor element 30 is supported. The sensing portion is provided with a sensing passage member 24. The sensing passage member 24 divides the bypass passage into three passages including two side passages and a sensing passage between them. The sensing passage has a cross-sectional area that is significantly narrower than that defined by the bypass passage 21 at upstream and downstream of the sensing passage. The sensing passage member 24 defines an inlet 24a, an outlet 24b, and a restrictor 24c. The restrictor 24c defines a restricted passage in the sensing passage. A support member 23 is disposed in the sensing passage. The support member 23 is formed in a plate shape. The support member 23 is disposed the center of the bypass passage 21 and is parallel to the center axis of the bypass passage 21. The support member 23 covers a substrate 22 on which the sensor element 30 is fixed. The sensor element 30 is fixed on the substrate 22 by appropriate means such as adhesion. The sensor element 30 has a sensing surface which is exposed to air through the support member 23. The sensing surface is supported in parallel to the center axis of the bypass passage 21 and flow direction of air in the bypass passage 21. The sensing surface is supported in parallel to the center axis of the intake passage 100 and a primary airflow direction in the intake passage 100. The substrate 22 is fixed on a member defining the passage member 20 by adhesion. The sensor element 30 is electrically connected with the circuit in the circuit section 10.

The sensor element 30 is formed in a thin plate shape. The sensor element 30 may be also referred to as a membrane type sensor or a chip sensor. The sensor element 30 is a thermal type flow sensor. For example, the sensor element 30 has a thin substrate and a plurality of resistor elements on the substrate. The resistor elements are driven for measuring flow amount. For instance, the sensor element 30 may have a heater resistor, sensor resistors and a temperature compensation resistor. In alternative, the sensor element 30 may be another type of flow sensor such a hot wire type and a semiconductor type.

The passage member 20 further has a column 50 having a circular cross-section with respect to the airflow direction. The column 50 is located on the center of the bypass passage 21. The column 50 is supported in the bypass passage 21 in a transversal manner. The column 50 is located upstream of the sensing passage member 24 and extends in parallel to the support member 23 and the surface of the sensor element 30. The column 50 may be formed in a hollow cylindrical shape. The column 50 is formed and located so that the inlet 24a is completely hidden behind the column 50 with respect to the forward direction of airflow in the bypass passage 21. As a result, if inside the bypass passage 21 is observed from upstream side of the column 50 along the forward direction of airflow, the inlet 24a is completely hidden behind the column 50. In this embodiment the column 50 has a width W1 that is wider than the width W2 of the sensing passage defined by the sensing passage member 24. The column 50 works as an obstruction member. The column may be provided with a ball portion located upstream of the inlet 24a and a supporting plate for supporting the ball in the bypass passage 21.

Since the column 50 is a columnar shape, the column 50 provides a leading end, gradually spreading surfaces facing upstream, a maximum cross sectional portion, gradually converging surfaces facing downstream and a trailing end. The leading end is the most upstream end of the column 50. The trailing end is the most downstream end of the column 50. The gradually spreading surfaces divides airflow and smoothly guides the divided airflows in both sides of the bypass passage 21. The maximum cross sectional portion has a cross sectional are corresponding to a projected area of the column 50. The projected area is obtained behind the column 50 with respect to the forward airflow direction 1. The projected area is sufficiently wide for hiding the inlet 24a behind the column 50. The gradually converging surfaces are extending to the trailing end. The gradually converging surfaces allow airflow returns to the center region of the bypass passage, but the gradually converging surfaces generate an unsteady flow region immediately downstream the column 50.

Figure 4:
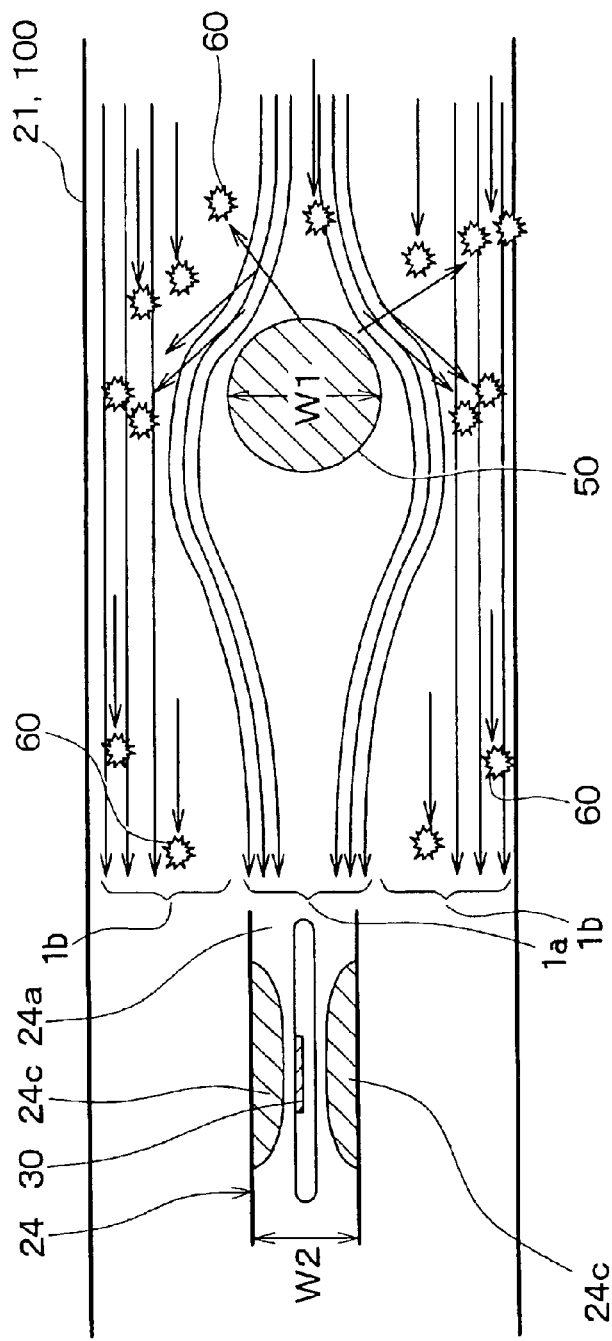
FIG. 4 is a schematic cross sectional view of the airflow meter showing behavior of foreign particles according to the first embodiment of the present invention.

FIG. 4 shows behavior of dust in the airflow. The dust 60 such as foreign particle flows in the forward airflow direction 1. The column 50 spreads the airflow and directs the airflow outwardly in both sides of the bypass passage 21. Simultaneously, the column 50 interferes with the dust directly. Therefore, the dust in the airflow directed toward both sides of the bypass passage 21. The column 50 defines a triangular shaped unsteady flow region. In a downstream of the column 50, the airflow is directed inwardly and gradually returns to the center region of the bypass passage 21. Then, the airflow becomes a steady parallel airflow after flowing in a certain distance from the column 50. The inlet 24a is located downstream of the position in which the airflow becomes the steady airflow again. In a downstream of the column 50, since the dust has greater inertia than air, the dust still flows both sides of the bypass passage 21 and does not oriented inwardly to the central region. Therefore, an airflow 1a flowing in the center region contains less dust than an airflow 1b flowing in the side regions. The column 50 provides the airflow 1a containing less dust in the center of the bypass passage 21 and provides the airflow 1b containing more dust in both sides of the bypass passage 21. The sensing passage 24 is capable of introducing the airflow 1a since the inlet 24a is located behind the column 50.

The airflow meter S1 has three-stage arrangement of the airflow passage. The first stage is the main passage provided by the intake pipe 100. The second stage is the bypass passage 21 in which a part of the intake air flowing in the main passage is introduced. The third stage is the sensing passage in which a part of the bypassing air flowing in the bypass passage 21 is introduced. The column 50 is disposed in the bypass passage 21. Therefore, the column 50 does not increase flow resistance significantly. Further, since the bypass passage 21 is capable of regulating airflow into a steady flow, therefore, the column 50 effectively directs the dust outwardly.

As a result, it is possible to prevent the dust from entering into the sensing passage in which the sensor element 30 is located. It is possible to protect the sensor element 30 from damage caused by the dust.

The column 50 is also effective for the intake pipe 100. As shown in FIGS. 3 and 4, the outside wall may be the intake pipe 100 instead of the bypass passage 21. In such the case, the sensing passage member 24 is directly located in the intake pipe 100.

Further, although the column 50 is located in the center of the bypass passage 21 or the intake pipe 100 in the first embodiment, the obstruction member may be located on the side of the bypass passage 21 or the intake pipe 100. In this case, the sensing passage member 24 and the sensor element 30 is also located on the side of the bypass passage 21 or the intake pipe 100 to be hidden behind the obstruction member.

Further, the airflow meter may have an additional obstruction member in the intake pipe 100 in addition to the column 50 in the bypass passage.

Hereinafter plural embodiments are described. In the following description, the same or similar element which is already described in the preceding embodiment is indicated by the same reference number as the preceding embodiment and is not repeatedly explained.

Second Embodiment

Figure 5:
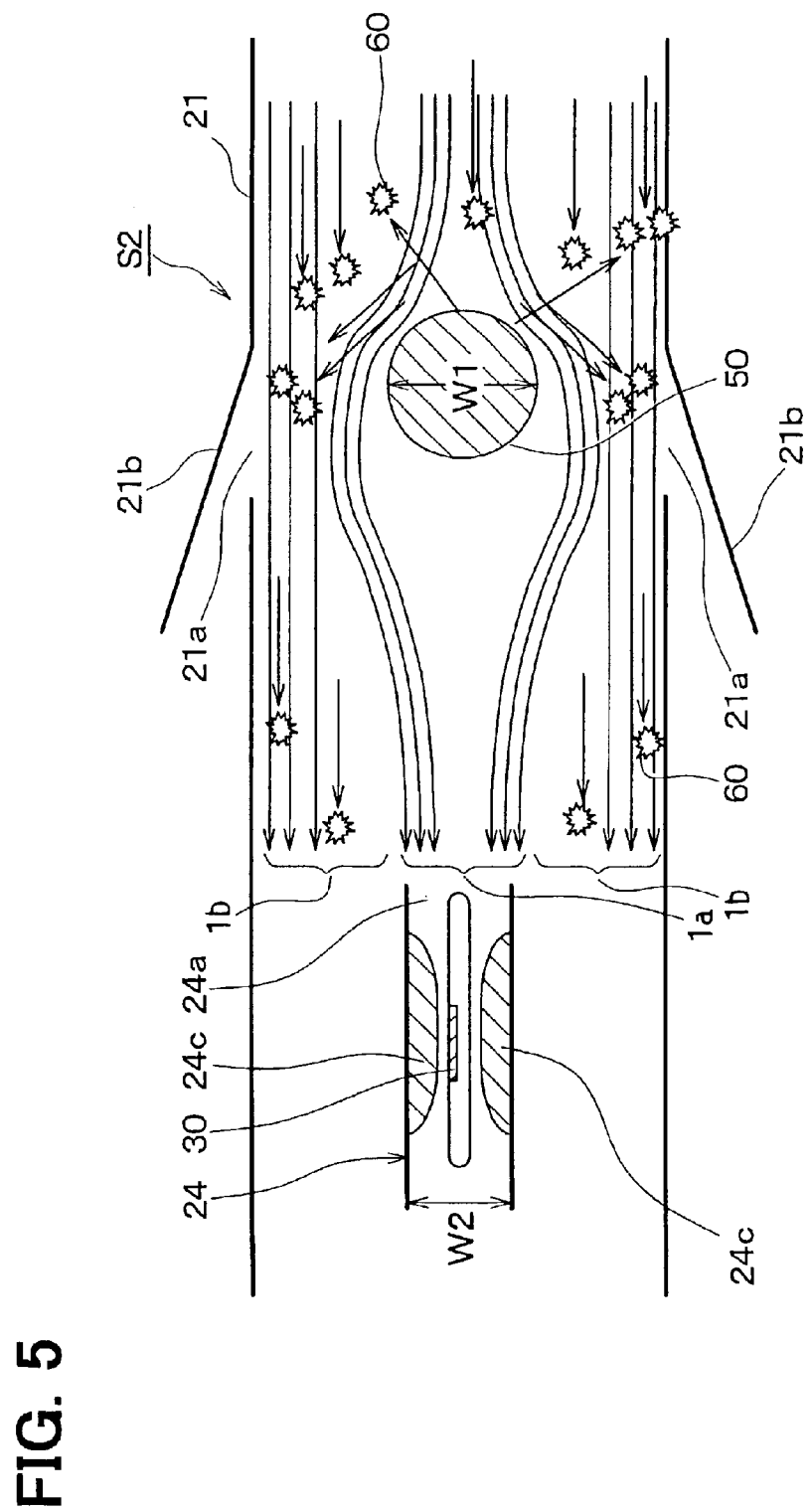
FIG. 5 is a schematic cross sectional view of an airflow meter showing behavior of foreign particles according to a second embodiment of the present invention.

Referring to FIG. 5, an airflow meter S2 according to a second embodiment has trapping portions 21a on both sides of the bypass passage 21. The trapping portions 21a are located on a position to which the column 50 directs the dust. The position is slightly downstream of the column 50. The trapping portions 21a are communicated with the intake pipe 100 as ejecting passages for ejecting the dust outside the bypass passage 21. The trapping portions 21a are covered with shields 21b and directed toward downstream of the intake pipe 100.

According to the second embodiment, the dust that is directed outwardly by the column 50 trapped before reaching around the inlet 24a of the sensing passage. In addition, the dust is ejected into the intake pipe 100. It is possible to reduce the dust reaching to the sensor element 30. It is also possible to prevent the dust from hitting on the side walls and returning to the center of the bypass passage 21. Further, since the shields 21b cover the trapping portions 21a from upstream and provide passages leading to downstream, it is possible to prevent the dust from entering from outside.

Third Embodiment

Referring to FIG. 6, an airflow meter S3 according to a third embodiment has a smaller sensing passage. The sensing passage member 124 defines the sensing passage having a width W22 which is significantly smaller than the first embodiment. In addition, the sensing passage member 124 is not located on the center of the bypass passage 21. The sensing passage member 124 is located still behind the column 50, but is located slightly shifted from the center axis. In the downstream region of the column 50, a part of the airflow 1 becomes steady before entirety of the airflow 1a becomes steady. The sensing passage member 124 is located in such the part of the steady airflow. Therefore, it is possible to locate the sensing passage member 124 and the sensor element 30 close to the column 50.

Fourth Embodiment

Referring to FIG. 7, an airflow meter S4 according to a fourth embodiment has a column 55 in the intake pipe 100. The column 55 is located on the center of the intake pipe 100. The passage member 20 defines an inlet 21c of the bypass passage 21 at the center of the intake pipe 100. The column 55 is located upstream of the inlet 21c. The passage member 20 does not have the sensing passage member 24 in the first embodiment. The sensor element 30 is supported on the substrate similarly to the first embodiment and is located in the bypass passage 21. The airflow meter S4 may have the same sensing passage member 24 as described in the first embodiment.

Referring to FIG. 8, the column 55 is supported on the passage member 20 by supporting beams 55a. The column 55 has a sufficient cross sectional area to hide the inlet 21a with respect to the airflow 1 in the intake pipe 100. The inlet 21c is completely hidden behind the column 55 with respect to the direction of the airflow 1.

Figure 9:
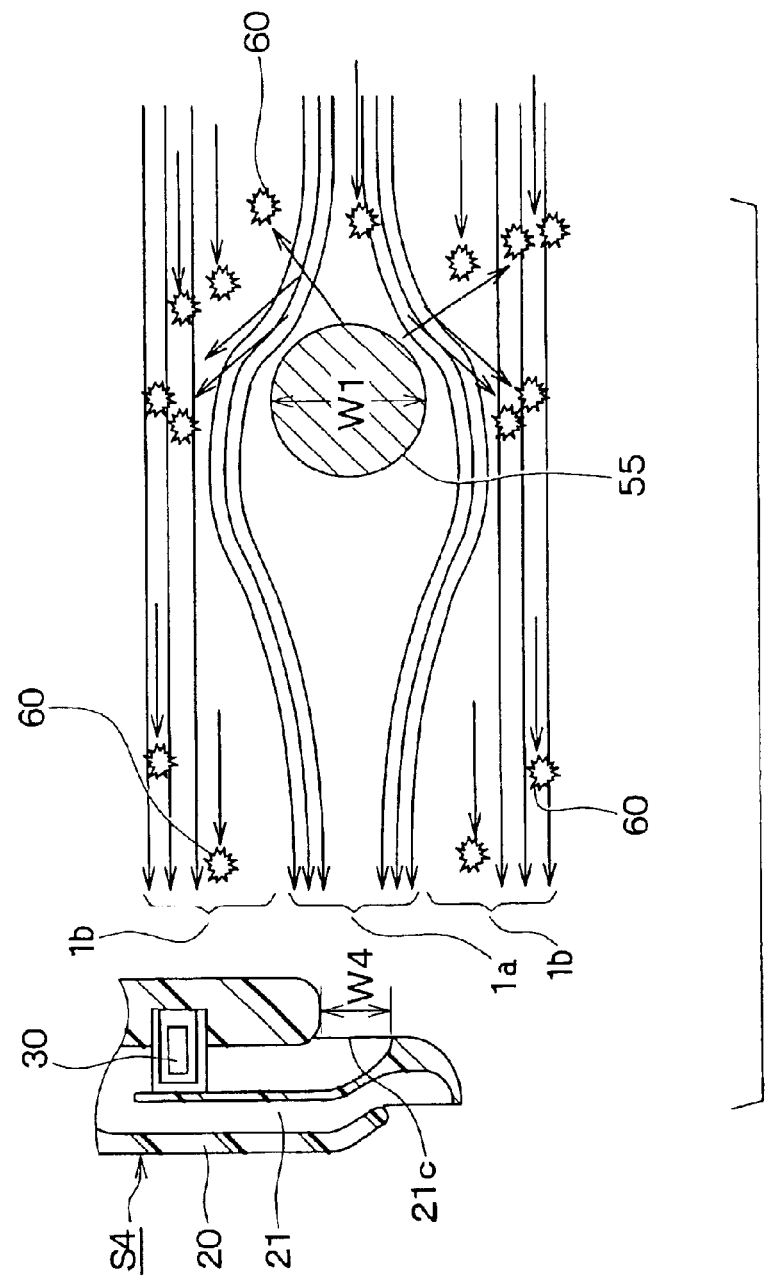
FIG. 9 is a schematic cross sectional view of the airflow meter showing behavior of foreign particles according to the fourth embodiment of the present invention.

FIG. 9 shows behavior of the dust 60 in the intake pipe 100. The column 55 has a width WI which is wider than a width W4 of the inlet 21c. The column 55 is much longer than the other width of the inlet 21c. Therefore, the inlet 21c is completely hidden behind the column 55. The column 55 works as the obstruction member for directing the dust 60 outwardly. As shown in FIG. 9, the inlet 21c introduces the airflow 1a containing less dust.

Although the airflow meter S4 does not have the column 50 in the bypass passage 21, the column 55 prevents the sensor element 30 from damage. The airflow meter S4 may have the column 50 in the bypass passage 21.

The obstruction member may be disposed on the side of the intake pipe 100. In such the case, the inlet 21c is also located on a side region of the intake passage in the intake pipe 100 so that the inlet 21c is hidden behind the obstruction member.

Fifth Embodiment

Figure 10:
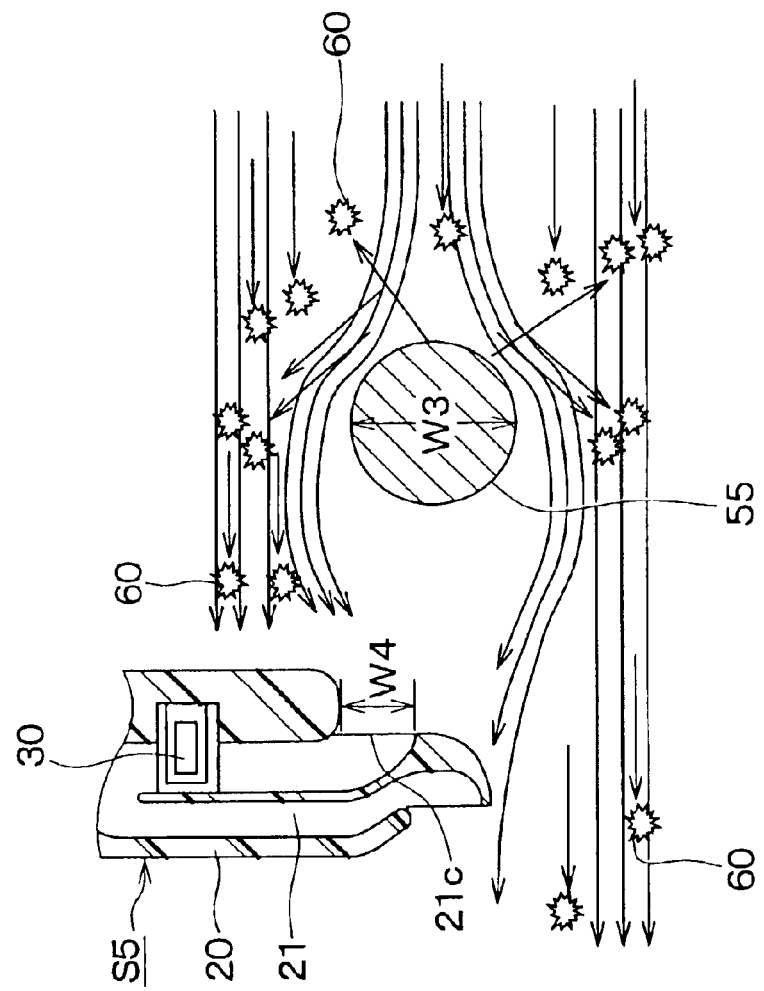
FIG. 10 is a schematic cross sectional view of an airflow meter showing behavior of foreign particles according to a fifth embodiment of the present invention.

Referring to FIG. 10, an airflow meter S5 according to a fifth embodiment has the inlet 21a close to the column 55. The inlet 21c is not located on the center of the bypass passage 21. The inlet 21c is located still behind the column 55, but is located slightly shifted from the center axis. The inlet 21c introduces a part of the airflow 1 containing less dust. It is possible to locate the inlet 21c close to the column 55.

Sixth Embodiment

Figure 11:
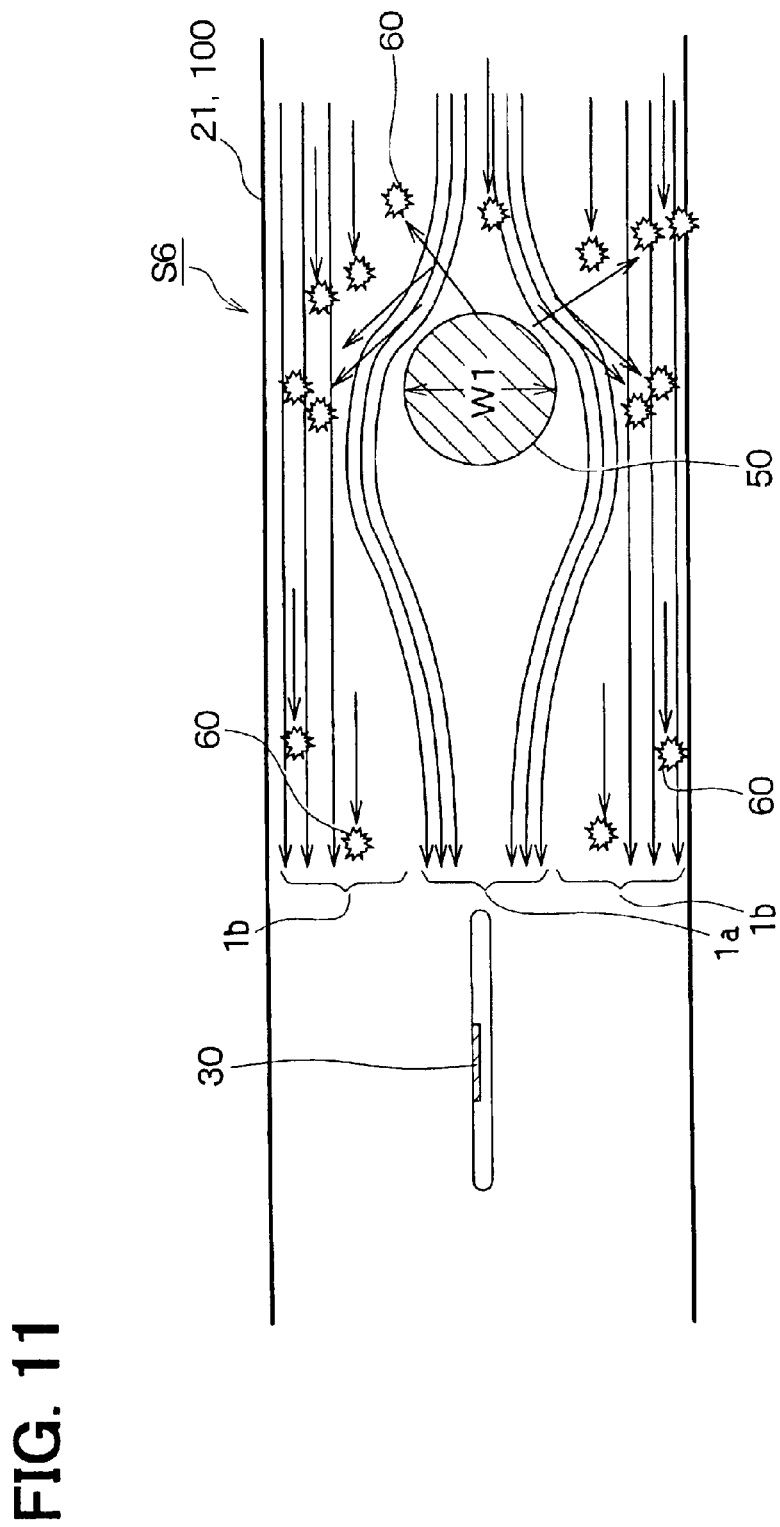
FIG. 11 is a schematic cross sectional view of an airflow meter showing behavior of foreign particles according to a sixth embodiment of the present invention.

FIG. 11 shows a diagrammatical view of an airflow meter S6 according to a sixth embodiment. The airflow meter S6 does not have the sensing passage member 24 in the first embodiment. The sensor element 30 is directly exposed to the bypass passage 21 or the intake pipe 100. The sensing element 30 is located behind the column 50 in a manner that the sensing element 30 is completely hidden behind the column 50 with respect to the airflow direction.

According to the sixth embodiment, since the sensor element 30 can be located in the airflow 1a containing less dust. Therefore, it is possible to prevent the sensor element from damage.

Seventh Embodiment

Figure 12:
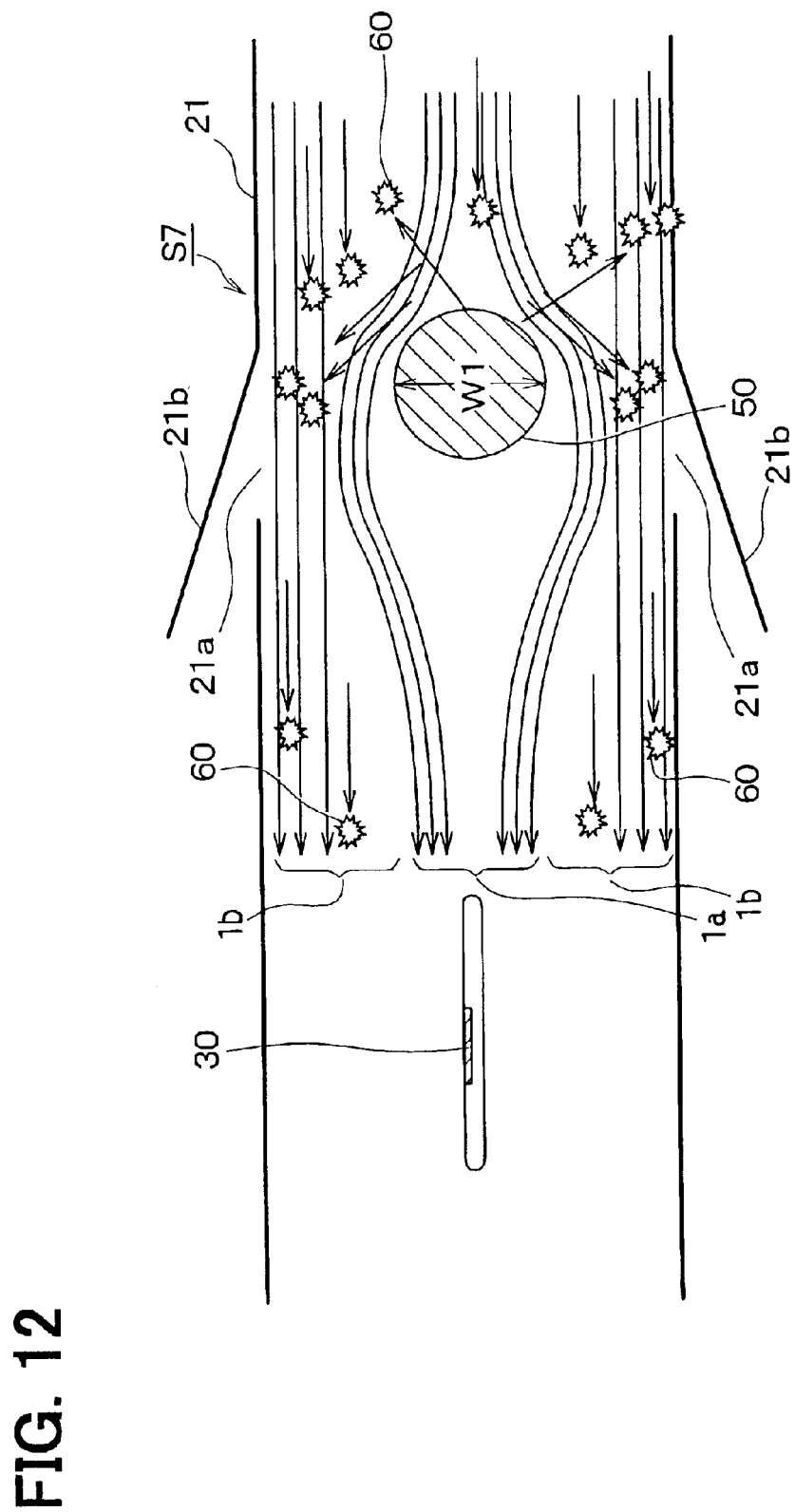
FIG. 12 is a schematic cross sectional view of an airflow meter showing behavior of foreign particles according to a seventh embodiment of the present invention.

FIG. 12 shows an airflow meter S7 according to a seventh embodiment. The seventh embodiment is a modification of the sixth embodiment that is similar to the difference between the first and second embodiments. The trapping portion 21a improves the protection of the sensor element 30 against the dust 60.

Eighth Embodiment

Figure 13:
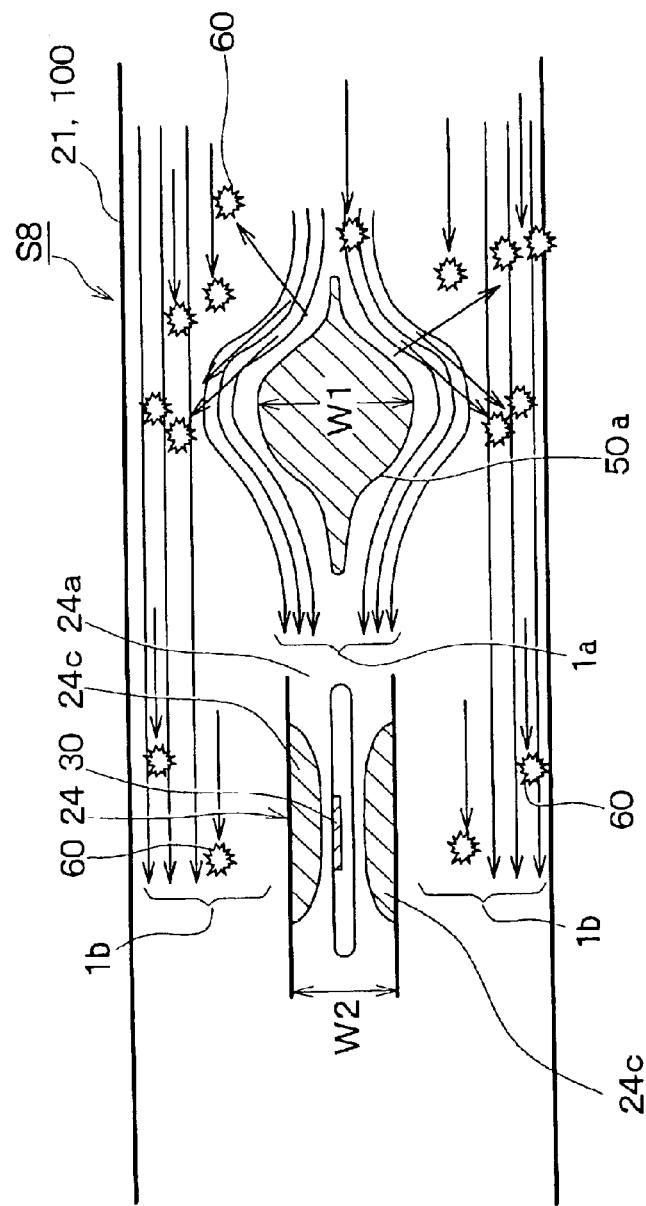
FIG. 13 is a schematic cross sectional view of an airflow meter showing behavior of foreign particles according to an eighth embodiment of the present invention.

FIG. 13 shows an airflow meter S8 according to an eighth embodiment. The airflow meter S8 has similar components as described in the first embodiment except for a column 50a. The column 50a has a streamlined cross section. The column 50a reduces an unsteady flow region behind the column 50a and enables that the sensing passage 24 is located close to the column 50a. The column 50a has a cross section that is longer in the airflow direction than the width W1. The column 50a has leading portion which provides surfaces substantially parallel to the airflow direction. Then, the leading portion is gradually thickened along the airflow direction up to the width W1. The column 50a has a trailing portion. The trailing portion is gradually narrowed along the airflow direction from the width W1. Then, the trailing portion provides surfaces substantially parallel to the airflow direction at the most downstream end of the column 50a.

In the eighth embodiment, the inlet 24a is completely hidden behind the column 50a with respect to the airflow direction.

Ninth Embodiment

Figure 14:
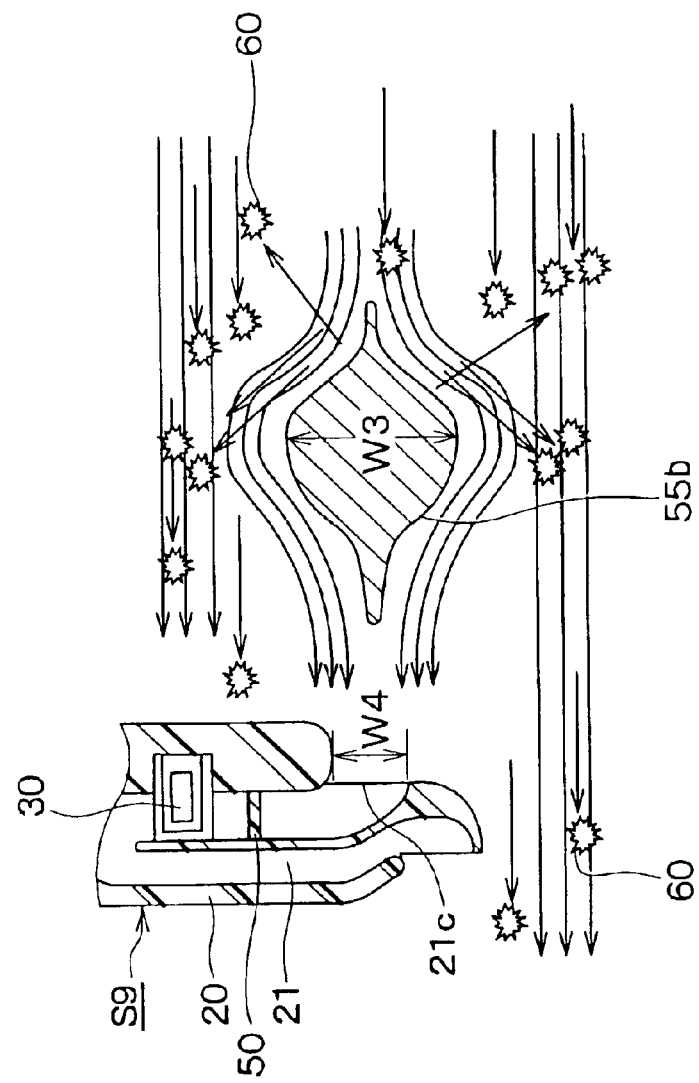
FIG. 14 is a schematic cross sectional view of an airflow meter showing behavior of foreign particles according to a ninth embodiment of the present invention.

FIG. 14 shows an airflow meter S9 according to a ninth embodiment. The ninth embodiment shows a modification of the fourth embodiment. A column 55b has the same cross section as the column 50a in the eighth embodiment. The column 55b enables that the inlet 21a is located just behind the column 55b. Further, the passage member 20 has the sensing passage and the column 50 in the bypass passage as explained in the first embodiment. In this embodiment, the column 55 located upstream of the inlet 21c of the bypass passage 21 is referred to as a first obstruction member. The column 50 located upstream of the inlet 24a of the sensing passage is referred to as a second obstruction member.

Tenth Embodiment

Figure 15:
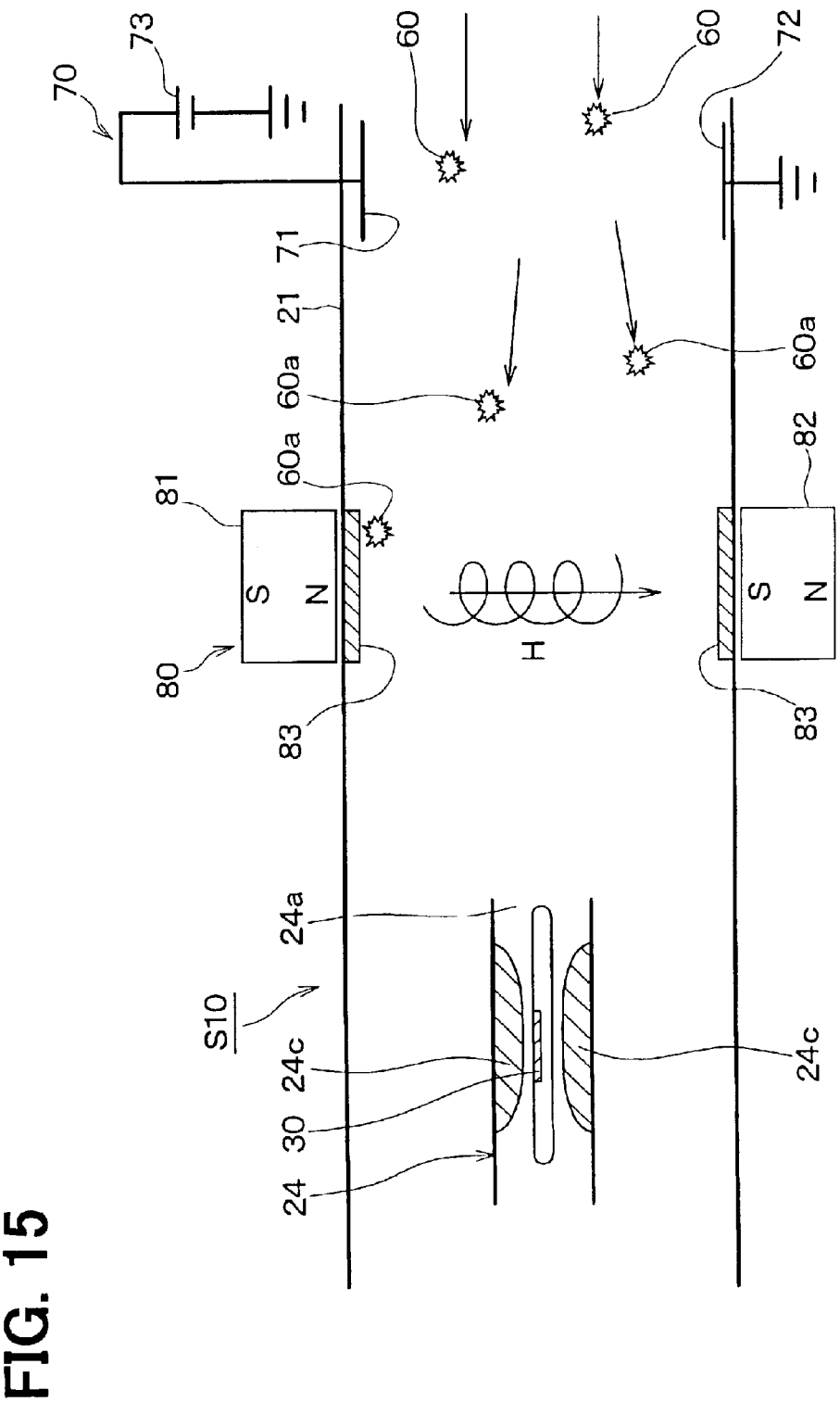
FIG. 15 is a schematic cross sectional view of an airflow meter showing behavior of foreign particles according to a tenth embodiment of the present invention.

FIG. 15 shows an airflow meter S10 according to a tenth embodiment of the present invention. The airflow meter S10 has a dust collector for collecting the dust 60 toward outside the bypass passage 21. The dust collector has an ionizing section 70 and a collector section 80. The ionizing section 70 has a pair of electrodes 71, 72 disposed in the bypass passage 21 and a power source 73. The electrodes 71, 72 are disposed on the inside surface of the bypass passage 21 to face each other. The power source 73 generates electric field between the electrodes 71, 72 to ionize the dust 60 flowing between the electrodes 71, 72. The collector section 80 has magnets 81, 82a and a collector sheet 83 disposed on the inside of the bypass passage 21. The magnets 81, 82 forms magnetic field H across the bypass passage 21. Ionized dust 60a is affected by the magnetic field H and is directed outwardly with a spiral movement. The ionized dust 60a is at least directed outwardly, and collected on the collecting sheet 83. Therefore, airflow in the center of the bypass passage 21 contains less dust than airflow in side regions of the bypass passage 21. As a result, the airflow containing less dust is subject to enter the sensing passage.

According to the tenth embodiment, it is possible to reduce the dust in the airflow flowing around the sensor element 30. It is possible to prevent the sensor element 30 from damage.

Eleventh Embodiment

Figure 16:
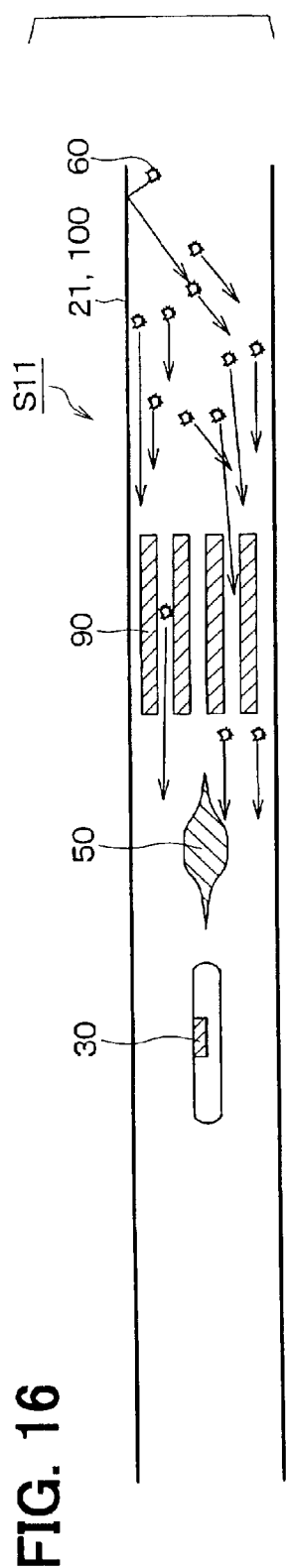
FIG. 16 is a schematic cross sectional view of an airflow meter showing behavior of foreign particles according to an eleventh embodiment of the present invention.

FIG. 16 shows an airflow meter S11 according to an eleventh embodiment of the present invention. The airflow meter S11 has a flow guide member 90 in the passage 21 or 100. The flow guide member 90 is located upstream of the obstruction member 50. The flow guide member guides and regulates airflow into parallel and steady flow before reaching to the obstruction member 50. The flow guide member 90 has at least one plate member. The flow guide member 90 has at least two surfaces that are substantially parallel to the airflow direction. The flow guide member 90 has a plurality of plates arranged in parallel to the flow direction.

According to the embodiment, it is possible to reduce the dust that flows inwardly at a downstream to the obstruction member 50. The flow guide member 90 may be located within either the bypass passage 21 or the intake pipe 100.

Twelfth Embodiment

Figure 17:
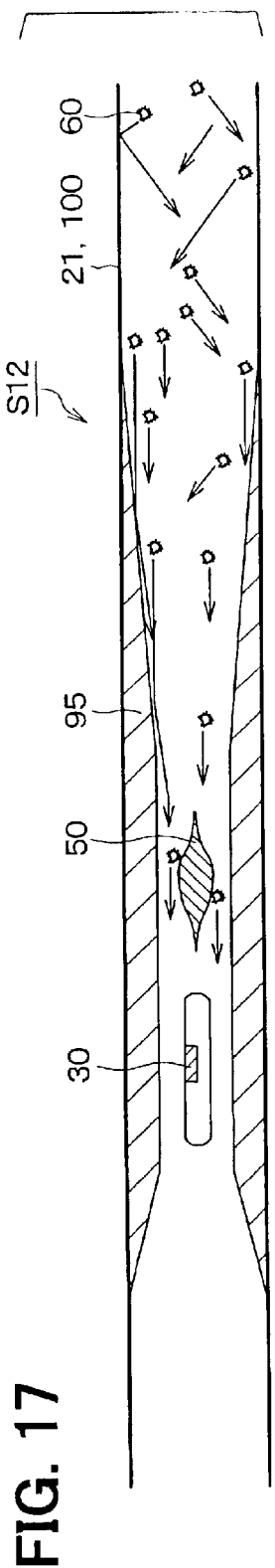
FIG. 17 is a schematic cross sectional view of an airflow meter showing behavior of foreign particles according to a twelfth embodiment of the present invention.

FIG. 17 shows an airflow meter S12 according to a twelfth embodiment. The airflow meter S12 has a restrictor 95 on either the bypass passage 21 or the intake pipe 100. The restrictor 95 provides a gradually narrowing passage that begins upstream of the obstruction member 50. The restrictor 95 provides a constant passage in which the obstruction member 50 and the sensor element 30 are disposed. The constant passage is narrower than the original passage 21, 100. The restrictor 95 provides gradually increasing passage on a downstream to the sensor element 30. The gradually narrowing passage guides and regulates airflow into parallel and steady flow. Therefore, it is possible to reduce the dust flowing inwardly at a passage between the obstruction member 50 and the sensor element 30. Since the restrictor 95 begins upstream of the obstruction member 50, that is the obstruction member 50 is in a restricted passage, it is possible to prevent the dust from changing flow direction inwardly at a downstream to the obstruction member 50.

Thirteenth Embodiment

Figure 18:
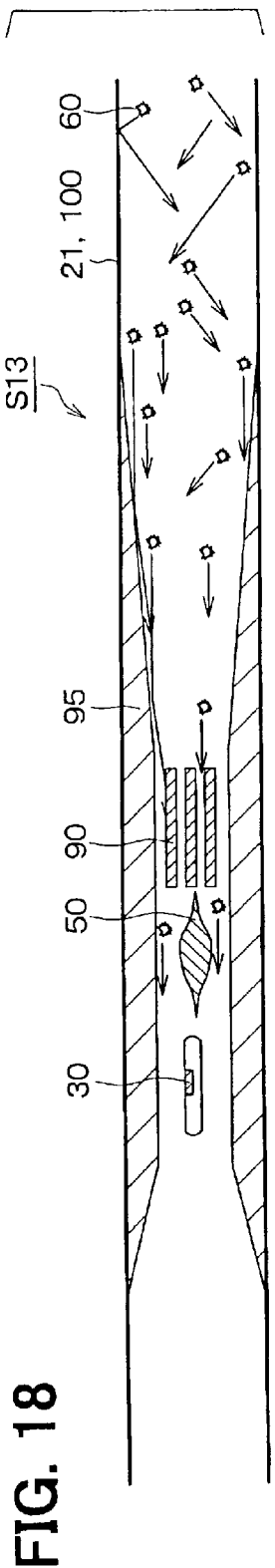
FIG. 18 is a schematic cross sectional view of an airflow meter showing behavior of foreign particles according to a thirteenth embodiment of the present invention.

FIG. 18 shows an airflow meter S13 according to a thirteenth embodiment. The airflow meter S13 is a combination of the eleventh embodiment and the twelfth embodiment. The airflow meter S13 has both the flow guide member 90 and the restrictor 95.

Fourteenth Embodiment

FIG. 19 shows an airflow meter S14 according to a fourteenth embodiment. The airflow meter S14 has a first obstruction member 50 located upstream of the sensor element 30. The airflow meter S14 also has a second obstruction member 51 located downstream of the sensor element 30. The first and second obstruction member 50, 51 are symmetrically arranged to the sensor element 30 with respect to the flow direction in the passage 21, 100. The sensor element 30 is completely hidden behind the first obstruction member 50 with respect to the forward direction I of the airflow. The sensor element 30 is completely hidden behind the second obstruction member 51 with respect to the reverse direction 2 of the airflow.

According to the embodiment, it is possible to protect the sensor element 30 from the dust in the reverse airflow. It is possible to detect the reverse airflow and measure an amount of the reverse airflow. In addition, a circuit for detecting the forward airflow and a circuit for detecting the reverse airflow may be arranged in the same arrangement since the components in the airflow passage are symmetrically arranged.

In addition to the embodiment, flow guide members may be disposed on both upstream of the obstruction member 50 and downstream of the obstruction member 51.

Fifteenth Embodiment

FIG. 20 shows an airflow meter S15 according to a fifteenth embodiment. The airflow meter S15 has a restrictor 95 in addition to the fourteenth embodiment.

Sixteenth Embodiment

FIG. 21 shows an airflow meter S16 according to a sixteenth embodiment. The airflow meter S16 has a support member 23a. The support member 23a is extending longer than the restrictor 95. The sensor element 30 is supported on the center of the support member 23a. A first obstruction member 50b is formed on the support member 23a as protrusions. The sensor element 30 is completely hidden behind the first obstruction member 50b with respect to the forward direction 1 of the airflow. A second obstruction member 51b is formed on the support member 23a as protrusions. The sensor element 30 is completely hidden behind the second obstruction member 51b with respect to the reverse direction 2 of the airflow. The obstruction members 50b, 51b protect the sensor element 30 from both the forward and reverse airflow. The obstruction members 50b, 51b may be formed integrally with the support member 23a.

Seventeenth Embodiment

Figure 22:
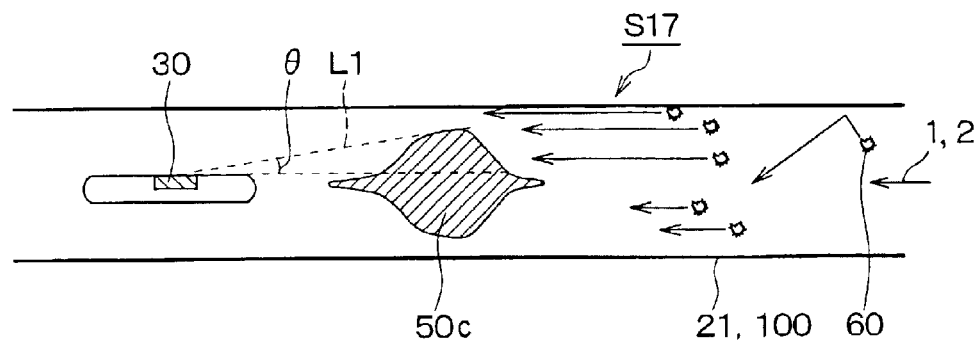
FIG. 22 is a schematic cross sectional view of an airflow meter showing behavior of foreign particles according to a seventeenth embodiment of the present invention.
Figure 23:
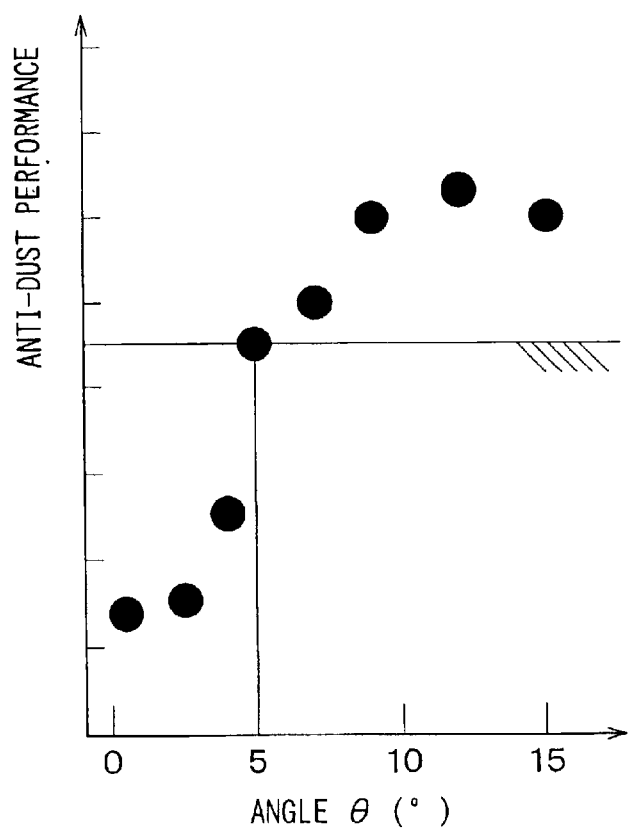
FIG. 23 is a graph showing a relationship between an inclination angle theta in FIG. 22 and anti-dust performance according to the seventeenth embodiment of the present invention.

FIG. 22 shows an airflow meter S17 according to a seventeenth embodiment. The airflow meter S17 has an obstruction member 50c located upstream of the sensor element 30. The obstruction member 50c is formed and disposed so that an inclination angle theta ($\theta$) is not less than 5 degrees (°). The inclination angle theta ($\theta$) is defined between an surface of the sensor element 30 and a tangential line L1 on the obstruction member 50c that passes through the center of the sensor element 30 as shown in FIG. 22. FIG. 23 is a graph showing a relationship between an anti-dust performance and the inclination angle theta ($\theta$). The anti-dust performance shows strength of the sensor element 30 against the dust. For example, the anti-dust performance is indicated by a flow speed in which a sample of the airflow meter is damaged due to the dust. According to FIG. 23, if the inclination angle is less than 5 degrees the anti-dust performance does not meet a requirement for the airflow meter for engine. Since the anti-dust performance is abruptly improved around 5 degrees, it is preferable to form and dispose the obstruction member 50c so as to provide the inclination angle not less than 5 degrees.

The relationship shown in FIG. 23 can be applied to the obstruction members described in the other embodiments. The relationship shown in FIG. 23 can be applied to the obstruction members located downstream of the sensor element. In the case of the obstruction member located upstream side of the inlet, the tangential line L1 is drawn from the center of the inlet.

Eighteenth Embodiment

Figure 24:
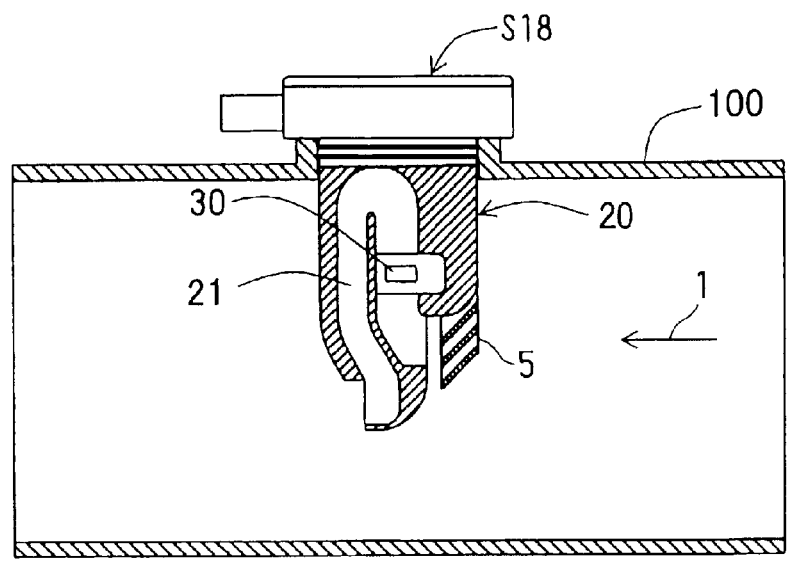
FIG. 24 is a partial cross sectional view of an airflow meter according to an eighteenth embodiment of the present invention.
Figure 25:
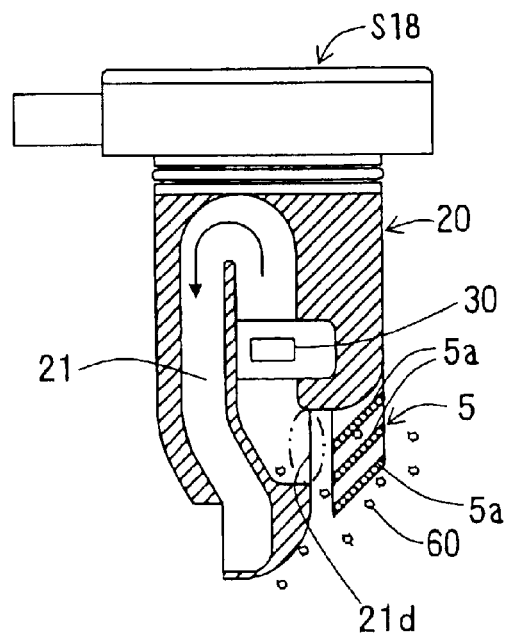
FIG. 25 is an enlarged cross sectional view of the airflow meter according to the eighteenth embodiment of the present invention.
Figure 26:
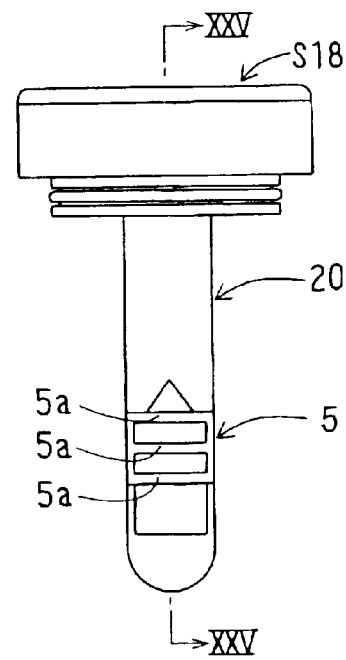
FIG. 26 is a frontal plan view of the airflow meter according to the eighteenth embodiment of the present invention.

FIGS. 24, 25, 26 show an airflow meter S18 according to an eighteenth embodiment. The airflow meter S18 has a deflector 5 disposed immediately upstream of the inlet 21d of the bypass passage 21. The deflector 5 is integrally formed with the passage member 20. The deflector 5 may be formed separately and fixed by appropriate means such as an adhesive.

The deflector 5 is a louver having a plurality of deflector plates 5a. The deflector plates 5a are supported in parallel to each other. The deflector plate 5a extends transversal direction with respect to the inlet 21d as shown in FIG. 26. The deflector plate 5a is inclined with respect to the airflow direction as shown in FIG. 25. The inlet 21d is completely hidden behind the deflector plates 5a with respect to the airflow direction. The deflector plates 5a are spaced apart from the inlet 21d in order to form a gap for ejecting the dust 60.

The deflector 5 guides the airflow away from the inlet 21d. Therefore, only a small component of the airflow is directly applied to the inlet 21d. As a result, it is possible to reduce the dust entering into the bypass passage 21. Moreover, the deflector 5 also reduces the speed of the dust 60. Therefore, even if the dust enters into the bypass passage 21, the dust 60 does not have energy to damage the sensor element 30. The deflector 5 is a dust preventing means for preventing the dust from entering into the inlet 21d.

Figure 27:
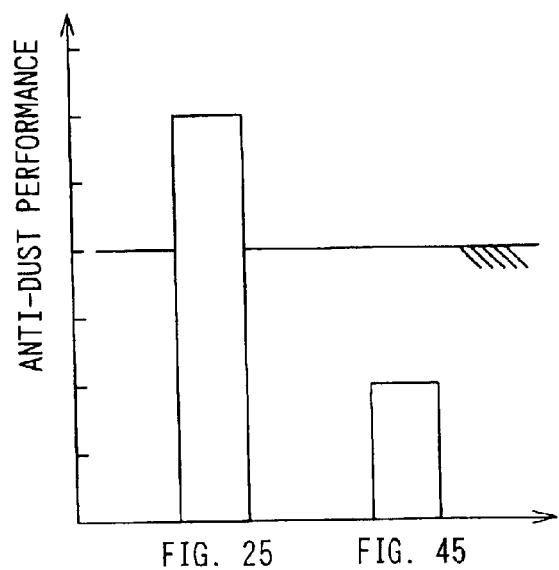
FIG. 27 is a graph showing anti-dust performance of the eighteenth embodiment of the present invention.
Figure 45:
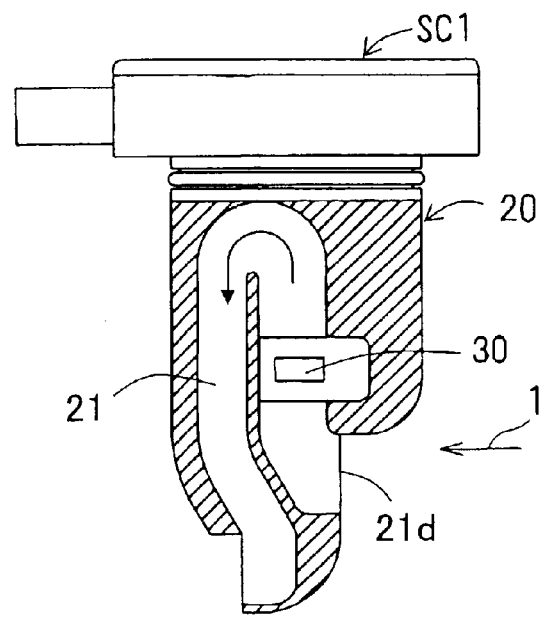
FIG. 45 is a partial cross sectional view of an airflow meter according to a comparative embodiment of the present invention.
Figure 46:
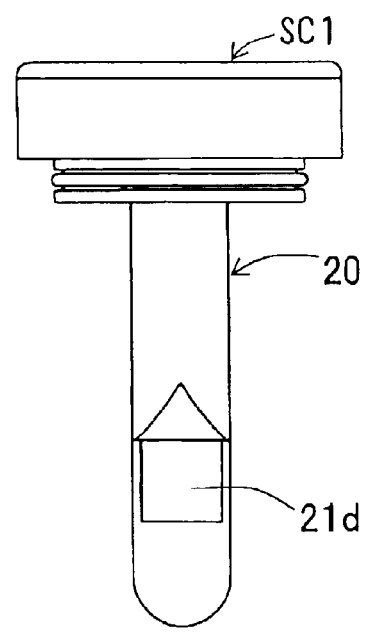
FIG. 46 is a frontal plan view of the airflow meter according to the comparative embodiment of the present invention.
Figure 47:
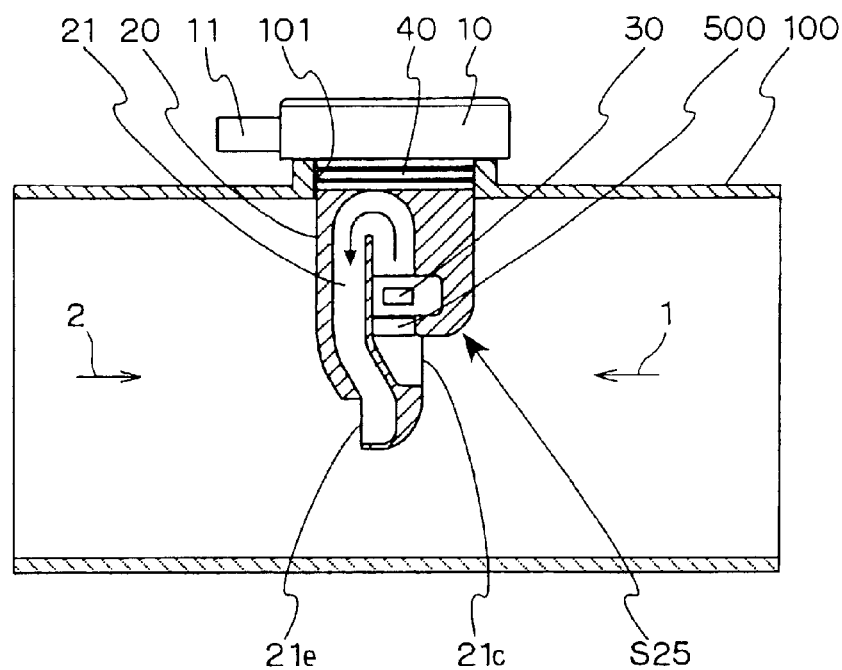
FIG. 47 is a partial cross sectional view of an airflow meter according to a twenty-fifth embodiment of the present invention.
Figure 48:
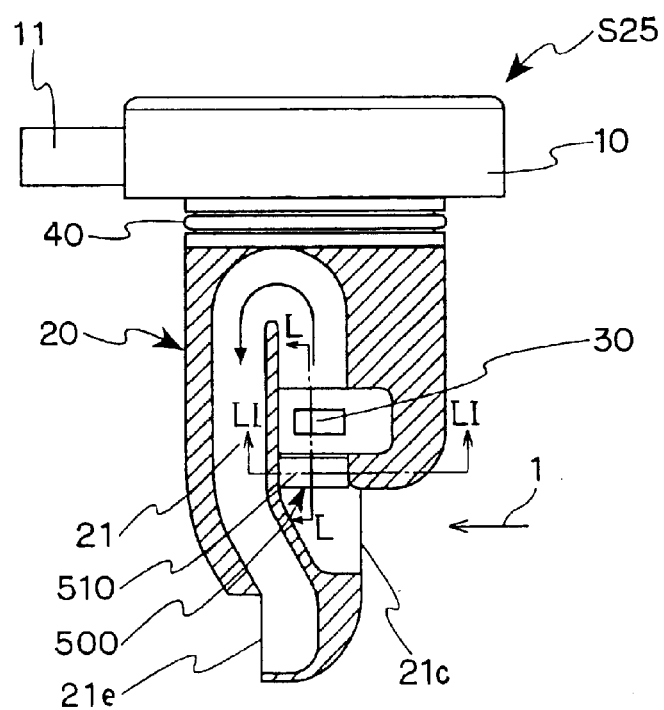
FIG. 48 is an enlarged cross sectional view of the airflow meter according to the twenty-fifth embodiment of the present invention.
Figure 49:
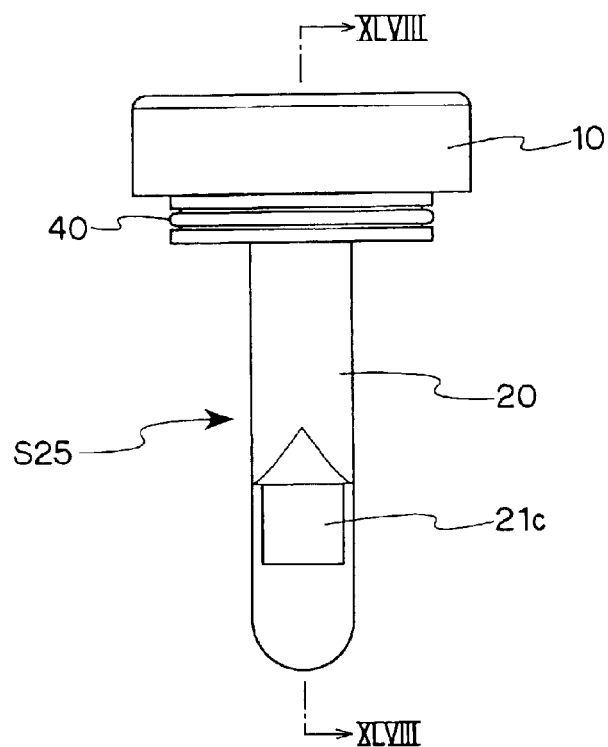
FIG. 49 is a frontal plan view of the airflow meter according to the twenty-fifth embodiment of the present invention.

According to the embodiment, is it possible to achieve an improved anti-dust performance as shown in FIG. 27. The airflow meter S18 shows higher anti-dust performance than a requirement for the airflow meter for engine. However, a comparative embodiment that has no deflector as shown in FIGS. 45 and 46 cannot qualify the required level.

Nineteenth Embodiment

Figure 28:
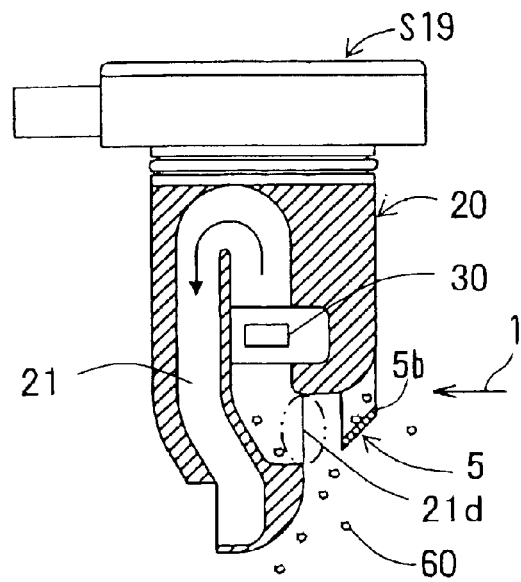
FIG. 28 is a partial cross sectional view of an airflow meter according to a nineteenth embodiment of the present invention.
Figure 29:
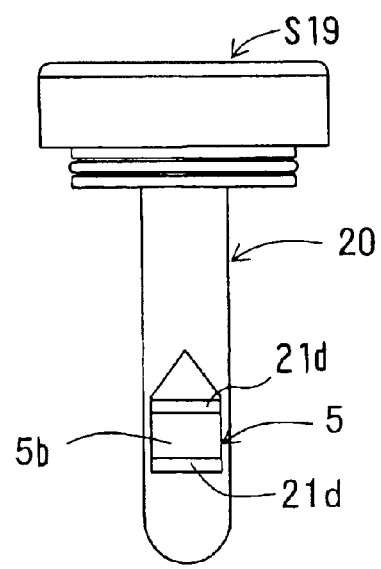
FIG. 29 is a frontal plan view of the airflow meter according to the nineteenth embodiment of the present invention.

FIGS. 28 and 29 shows an airflow meter S19 according to a nineteenth embodiment. The airflow meter S19 has a deflector 5 that has a single deflector plate 5b. The deflector plate 5b has a smaller projected area than the inlet 21d. A part of the inlet 21d is hidden behind the deflector plate 5b with respect to the airflow direction. The inlet 21d has portions that are directly exposed toward upstream as shown in FIG. 29.

Figure 30:
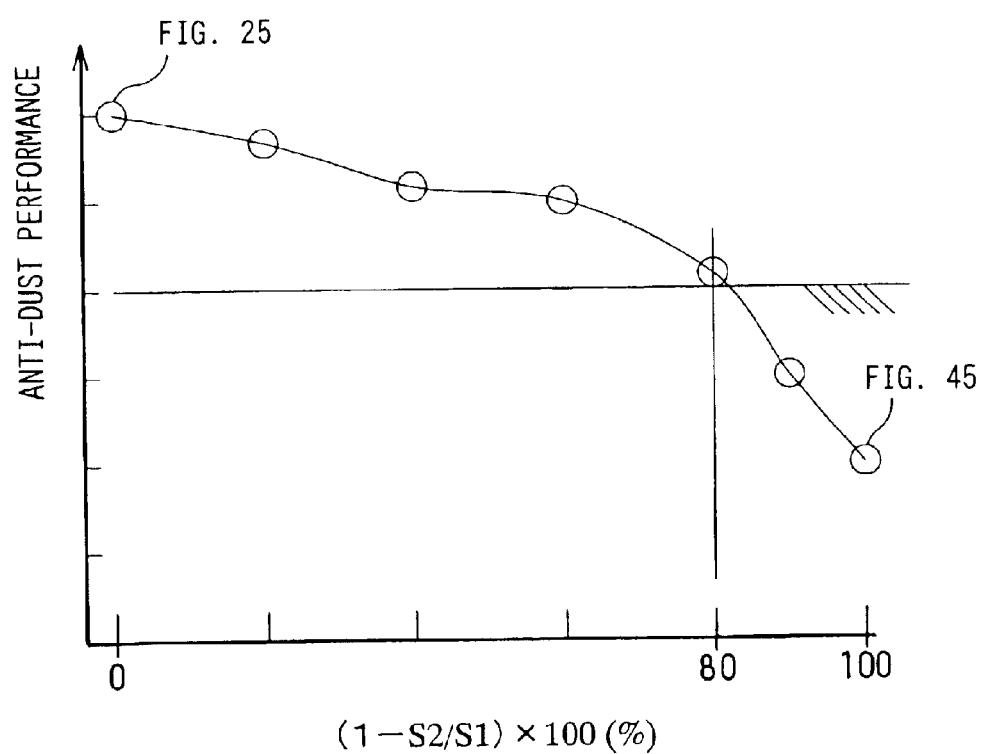
FIG. 30 is a graph showing anti-dust performance relative to a ratio between an exposed area and a hidden area according to the eighteenth and nineteenth embodiments of the present invention.

Such a partial covered arrangement is still advantageous for protecting the sensor element 30 from the dust 60 since the deflector plate 5b still reduces the dust and de-energizing the dust in a certain amount. FIG. 30 shows a graph of the anti-dust performance vs. a hidden ratio of the inlet 21d. The hidden ratio is expressed by (1-S2/11), where the S1 is a total cross sectional area of the inlet 21d, the S2 is a cross sectional area of the inlet 21d hidden by the deflector plate. According to FIG. 30, the required level of the anti-dust performance can be satisfied in case of designing the hidden ratio equal to or less than 80%. In FIG. 30, the eighteenth embodiment is plotted on 0% since the inlet 21d is completely hidden behind the deflector plates 5a. The comparative embodiment shown in FIGS. 45 and 46 is plotted on 100% since the inlet 21d in the comparative embodiment is entirely exposed toward upstream.

Twentieth Embodiment

Figure 31:
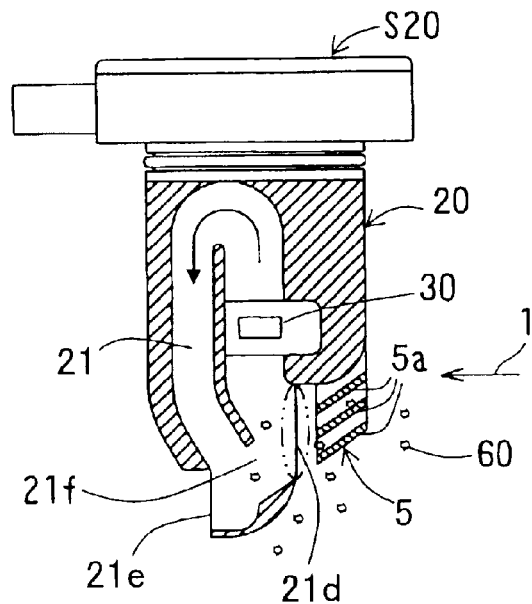
FIG. 31 is a partial cross sectional view of an airflow meter according to a twentieth embodiment of the present invention.
Figure 32:
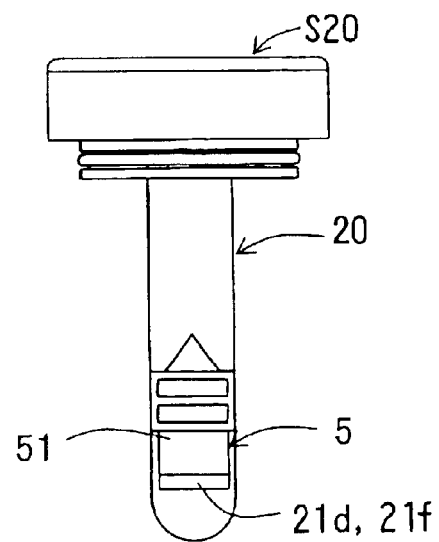
FIG. 32 is a frontal plan view of the airflow meter according to the twentieth embodiment of the present invention.

FIGS. 31 and 32 shows an airflow meter S20 according to a twentieth embodiment. The airflow meter S20 has a passage 21f directly connecting the inlet 21d and an outlet 21e of the bypass passage 21 in addition to the eighteenth embodiment. The passage 21f provides a short-cut for the dust downwardly directed by the deflector 5. It is possible to reduce the dust further. In this embodiment, although a part of the inlet 21d is exposed toward upstream as shown in FIG. 32, the exposed part of the inlet 21d directly communicated with the passage 21f. Therefore, the dust entering through the exposed part directly ejected through the passage 21f. The passage 21f is a through hole communicating between the vicinity of the inlet 21d and the vicinity of the outlet 21e.

Figure 33:
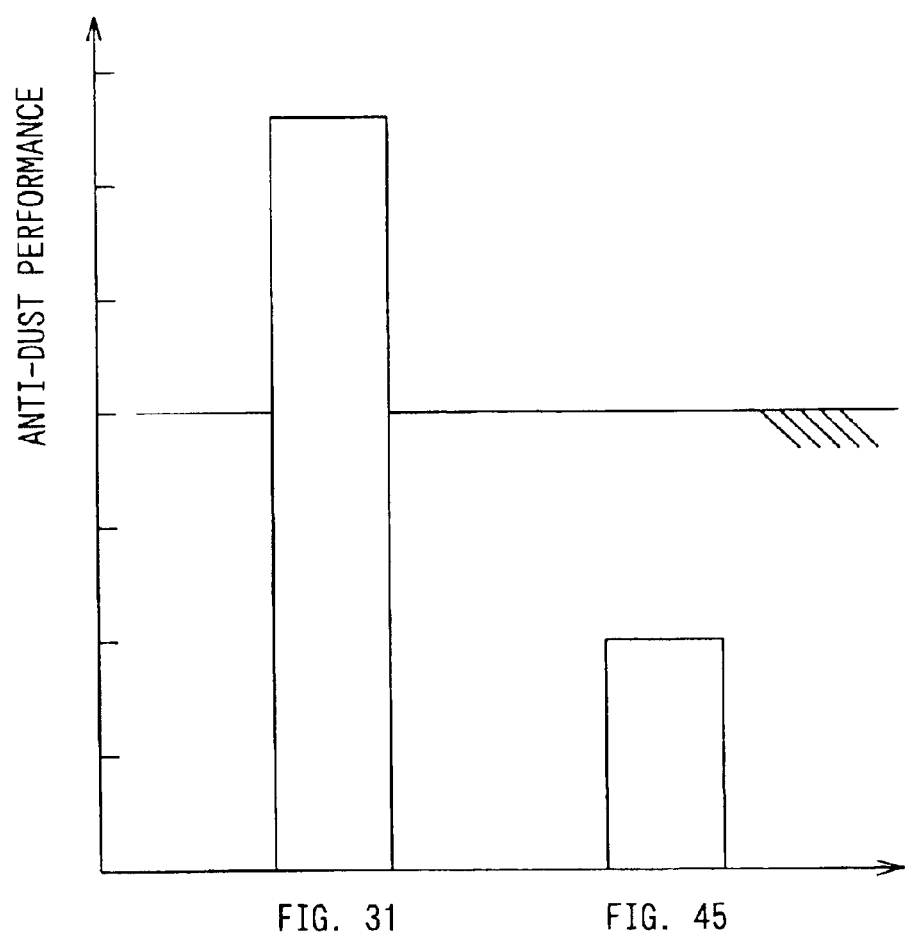
FIG. 33 is a graph showing anti-dust performance of the twentieth embodiment of the present invention.

According to the twentieth embodiment, it is possible to reduce the dust further. As a result, it is possible to improve the anti-dust performance from the eighteenth embodiment. FIG. 33 shows the anti-dust performance of the twentieth embodiment.

Twenty-first Embodiment

Figure 34:
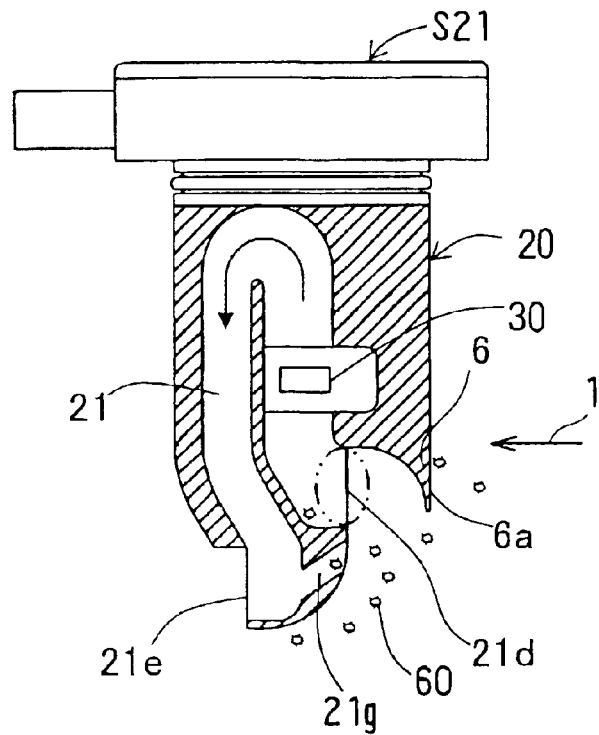
FIG. 34 is a partial cross sectional view of an airflow meter according to a twenty-first embodiment of the present invention.
Figure 35:
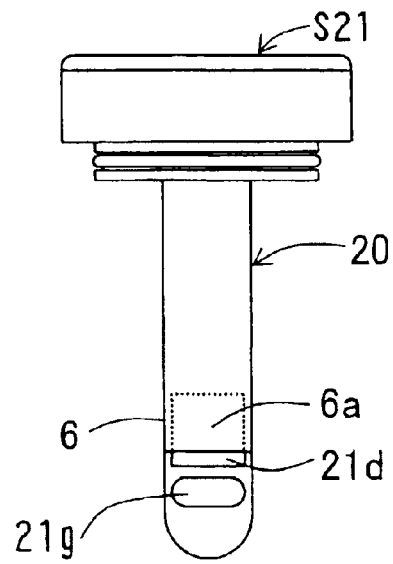
FIG. 35 is a frontal plan view of the airflow meter according to the twenty-first embodiment of the present invention.

FIGS. 34 and 35 shows an airflow meter S21 according to a twenty-first embodiment. The airflow meter S21 has a cover member 6 instead of the deflector 5. The cover member 6 is integrally formed with the passage member 20. The cover member 6 extends downwardly to hide the inlet 21d behind. The cover member 6 defines a semi-cylindrical space in front of the inlet 21d. The cover member 6 provides a flat front surface 6a which is perpendicular to the airflow direction 1. The cover member 6 hides almost all part of the inlet 21d as shown in FIG. 35. The airflow meter S21 further has a passage 21g. The passage 21g has an independent inlet below the inlet 21d for the bypass passage 21. The inlet of the passage 21g opens downstream to the edge of the cover member 6. The cover member 6 works as a deflector for guiding the airflow 1 away from the inlet 21d and for guiding the dust 60 away from the inlet 21d. The flat surface 6a guides the dust 60 toward the passage 21g. The passage 21g provides a short-cut for the dust 60 directed by the flat surface 6a. As a result, it is possible to reduce the dust to enter into the bypass passage 21. It is possible to improve the anti-dust performance. The cover member 6 is a dust preventing means for preventing the dust from entering into the inlet 21d.

Figure 36:
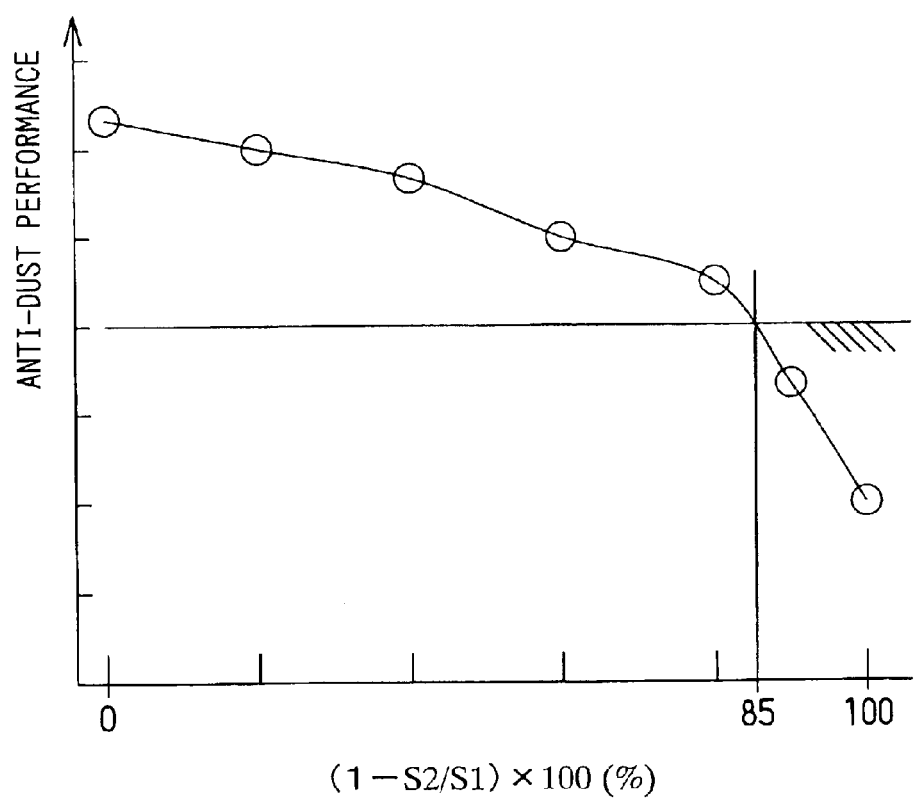
FIG. 36 is a graph showing anti-dust performance relative to a ratio between an exposed area and a hidden area according to the twenty-first embodiment of the present invention.

FIG. 36 shows the anti-dust performance vs. the hidden ratio of the inlet 21d. As shown in FIG. 36, when the hidden ratio is not greater than 85%, it is possible to satisfy the required level. The airflow meter S21 has the hidden ratio below 85%.

Twenty-second Embodiment

Figure 37:
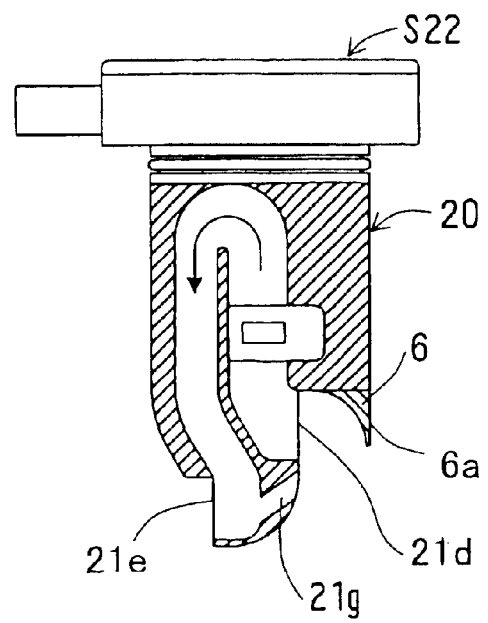
FIG. 37 is a partial cross sectional view of an airflow meter according to a twenty-second embodiment of the present invention.
Figure 38:
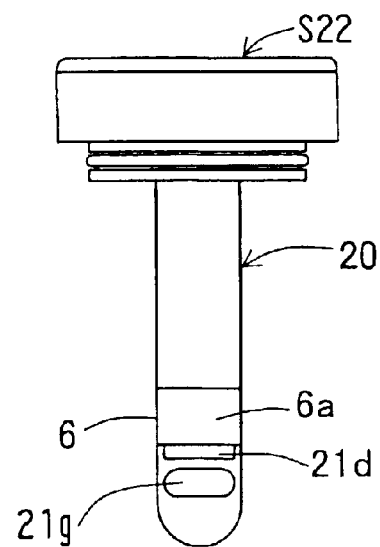
FIG. 38 is a frontal plan view of the airflow meter according to the twenty-second embodiment of the present invention.

FIGS. 37 and 38 show an airflow meter S22 according to a twenty-second embodiment. The airflow meter S22 is a modification of the twenty-first embodiment. The cover member 6 is separately formed from the passage member 20 and fixed on the passage member 20 by appropriate means such as an adhesive.

Twenty-third Embodiment

Figure 39:
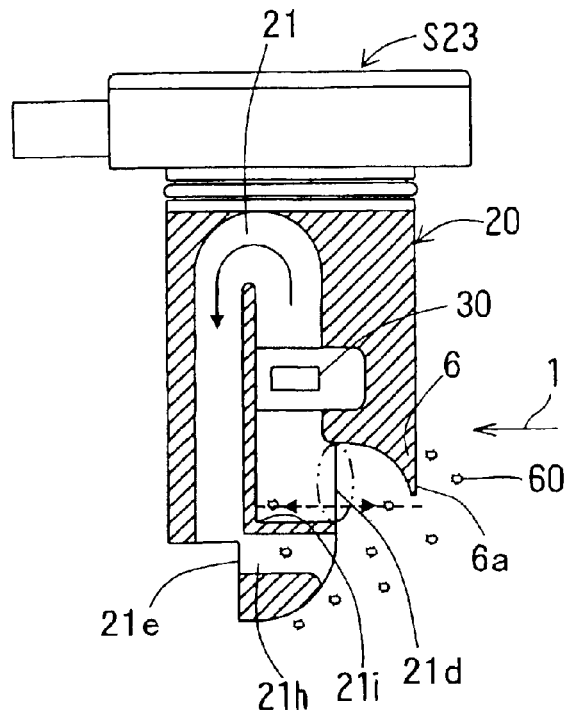
FIG. 39 is a partial cross sectional view of an airflow meter according to a twenty-third embodiment of the present invention.
Figure 40:
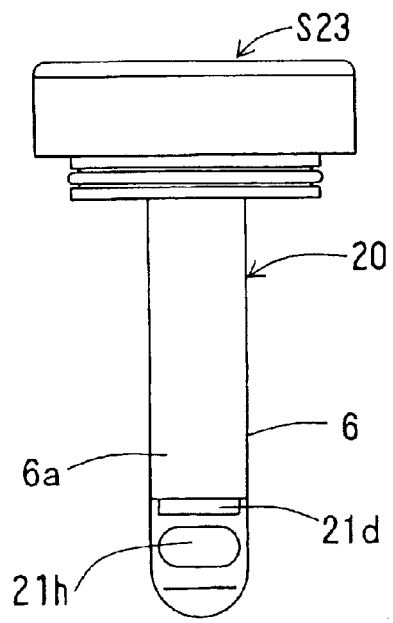
FIG. 40 is a frontal plan view of the airflow meter according to the twenty-third embodiment of the present invention.

FIGS. 39 and 40 show an airflow meter S23 according to a twenty-third embodiment. The airflow meter S23 has the cover member 6. The cover member 6 hides almost all of the inlet 21d with respect to the airflow direction 1. The airflow meter S23 has a passage 21h expending in parallel to the airflow direction 1. The passage 21h has an inlet opening below the inlet 21d. The airflow meter S23 has a right angle corner 21i just behind the inlet 21d. The right angle corner 21i is defined by a horizontal surface and a vertical surface of the bypass passage 21. The horizontal surface extends from a bottom edge of the inlet 21d in parallel to the airflow direction 1. The vertical surface extends from the horizontal surface in perpendicular to the airflow direction 1.

The dust entered through the inlet 21d hits on the vertical surface. As a result, it is possible to reduce the kinetic energy of the dust and the dust may be returned to the outside through the inlet 21d. In addition, the right angle corner 21i catches and keeps the dust and avoid the dust flowing toward the sensor element 30.

Figure 41:
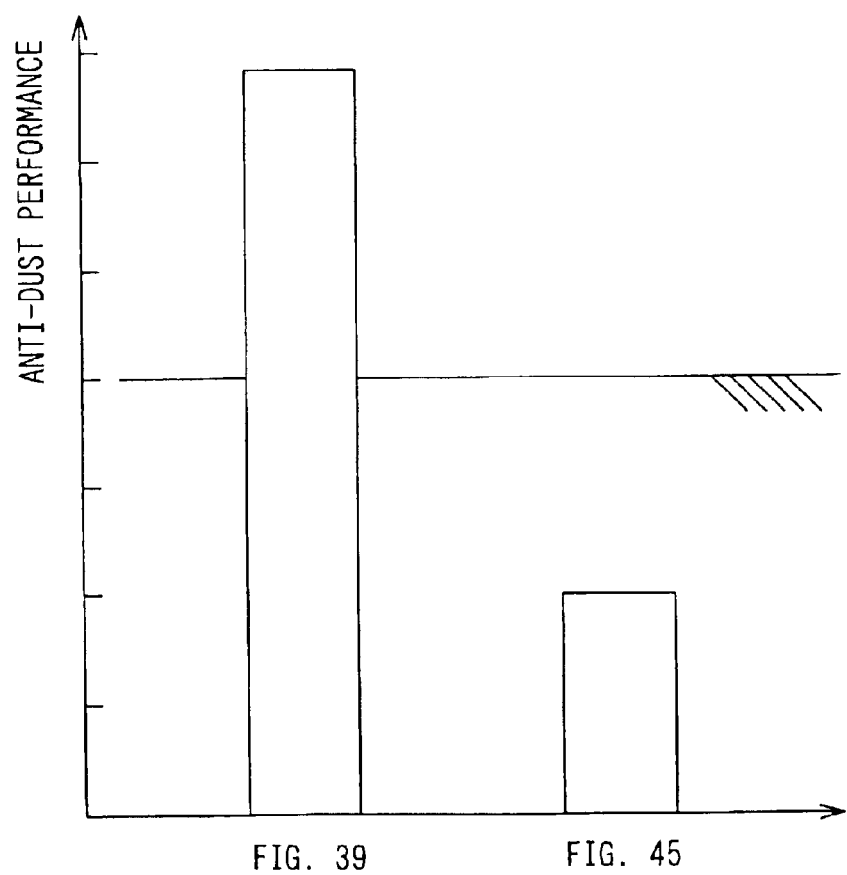
FIG. 41 is a graph showing anti-dust performance of the twenty-third embodiment of the present invention.

FIG. 41 shows the anti-dust performance of the twenty-third embodiment. It is possible to obtain an improved anti-dust performance.

Twenty-fourth Embodiment

Figure 42:
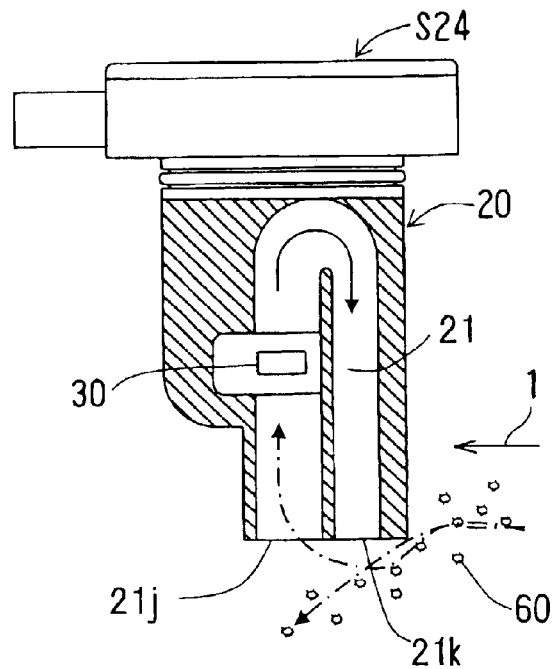
FIG. 42 is a partial cross sectional view of an airflow meter according to a twenty-fourth embodiment of the present invention.
Figure 43:
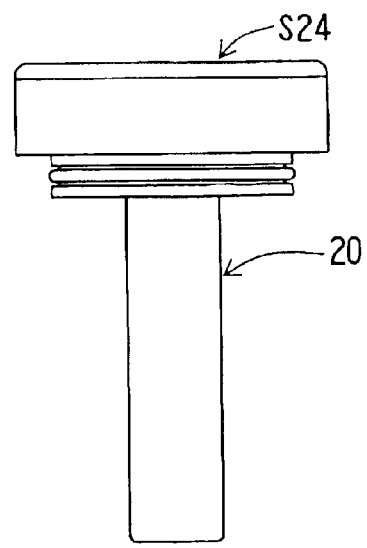
FIG. 43 is a frontal plan view of the airflow meter according to the twenty-fourth embodiment of the present invention.

FIGS. 42 and 43 show an airflow meter S24 according to a twenty-fourth embodiment. The airflow meter S24 has a bypass passage 21 that is designed to generate a bypass flow in an inverted direction to the other embodiments. The passage member 20 has a bottom surface parallel to the airflow direction. An inlet 21j and an outlet 21k for the bypass passage 21 are formed on the bottom surface. The inlet 21j is located downstream to the outlet 21k with respect to the airflow direction 1. Both the inlet 21j and the outlet 21k are opened in a direction perpendicular to the airflow direction 1. Therefore, both the inlet 21j and the outlet 21k are completely hidden by the passage member 20 with respect to the airflow direction 1.

Figure 44:
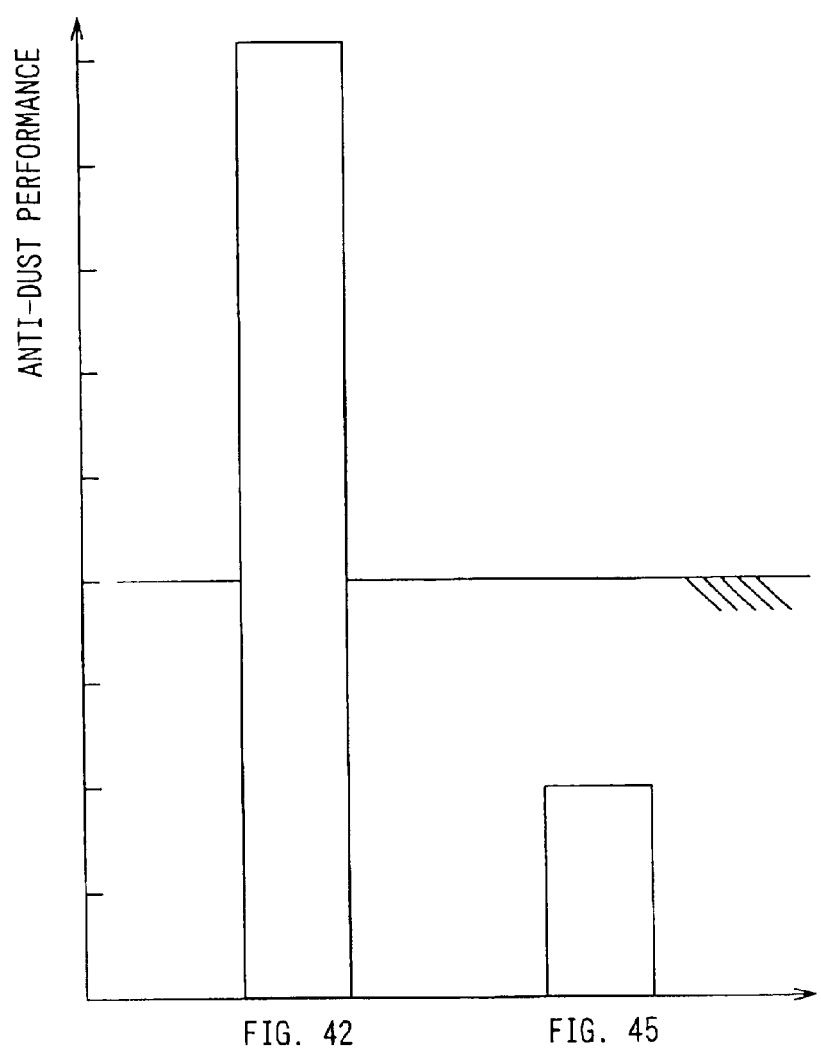
FIG. 44 is a graph showing anti-dust performance of the twenty-fourth embodiment of the present invention.

The passage member 20 has a front surface. The front surface is perpendicular to the airflow direction 1. The front surface is flat. The front surface directs the airflow and the dust downwardly. As a result, it is possible to reduce an amount of the dust 60 entering into the inlet 21j. At least it is possible to reduce the speed of the dust 60 entering into the inlet 21j. According to the airflow meter S24, it is possible to obtain an improved anti-dust performance as shown in FIG. 44.

Twenty-fifth Embodiment

Figure 50:
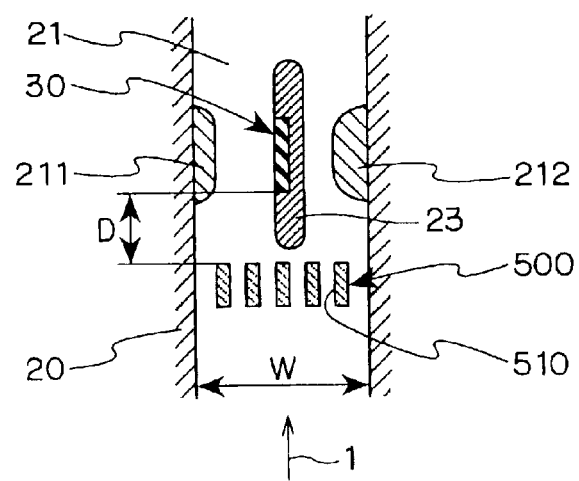
FIG. 50 is a cross sectional view of the airflow meter taken along L—L line in FIG. 48 according to the twenty-fifth embodiment of the present invention.
Figure 51:
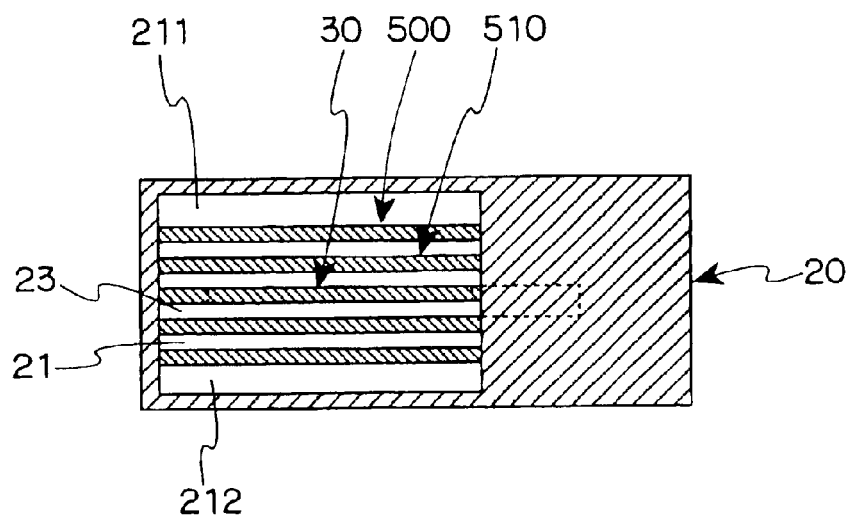
FIG. 51 is a cross sectional view of the airflow meter taken along LI—LI line in FIG. 48 according to the twenty-fifth embodiment of the present invention.

FIGS. 47–51 show an airflow meter S25 according to a twenty-fifth embodiment. The sensor element 30 is supported on the support member 23. The sensing surface of the sensor element 30 is supported on the center of the bypass passage and is supported in parallel to the longitudinal direction of the bypass passage 21 as shown in FIG. 50. The bypass passage 21 has restricting members 211 and 212. The restricting members 211 and 212 are located both vertical sides to the sensor element 30. Therefore, the restricting members 211 and 212 restrict vertical width of air passages formed on both sides of the supporting member 23. The restricting member 211 is formed lower than the other restricting member 212 to define higher air passage above the sensor element as shown in FIG. 50. The bypass passage 21 has a rectangular cross section as shown in FIG. 51. The support member 23 is supported in the bypass passage 21 so as to extend in a longer direction.

The airflow meter S25 has a flow guide member 500 in the bypass passage 21. The flow guide member 500 is located upstream of the sensor element 30. The flow guide member 500 has a plurality of plates 510. Each plate 510 has flat surfaces parallel to the longitudinal direction of the bypass passage, the airflow direction. The plates 510 are supported in the bypass passage 21. The plates 510 are supported in parallel to the support member 23 and the sensor element 30. One of the plates 510, the center one, is supported so that the flat surface thereof is aligned with the sensing surface of the sensor element 30 in the airflow direction. Therefore, the sensing surface of the sensor element 30 and the flat surface of the plate 510 located in the center are on the same plane as shown in FIG. 51.

The plates 510 guide airflow in a direction parallel to the sensing surface of the sensor element 30, therefore the dust is also directed in parallel to the sensing surface of the sensor element 30. It is possible to reduce the dust flowing toward the sensing surface of the sensor element 30. It is also possible to reduce the kinetic energy of the dust toward the sensing surface of the sensor element 30. Therefore, it is possible to protect the sensor element from the dust.

Figure 52:
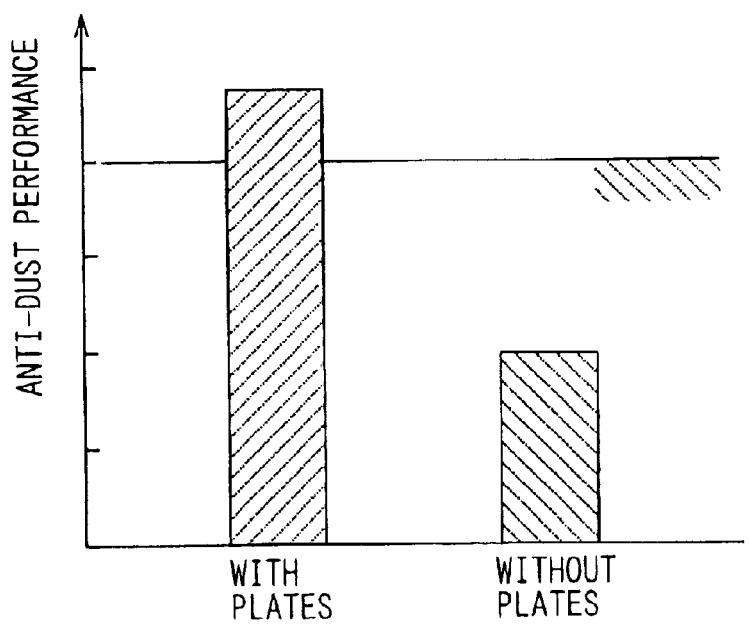
FIG. 52 is a graph showing anti-dust performance of the twenty-fifth embodiment of the present invention.

FIG. 52 shows an anti-dust performance of the twenty-fifth embodiment. By adding the plates 510, the anti-dust performance is significantly improved and qualifies the required level for the airflow meter for engine.

Figure 53:
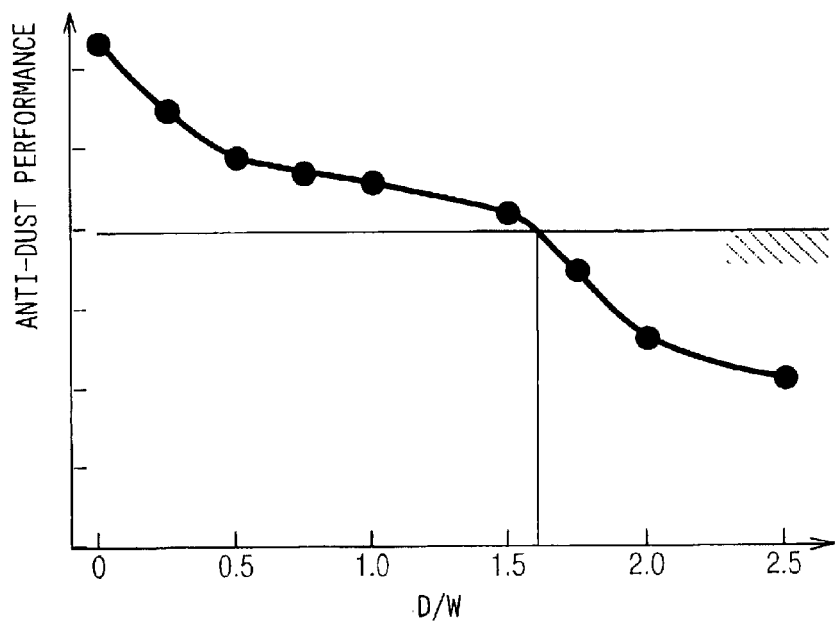
FIG. 53 is a graph showing anti-dust performance relative to a ratio L2/L1 defined in FIG. 50 according to the twenty-fifth embodiment of the present invention.

FIG. 53 shows a relationship between the anti-dust performance and a ratio of D/W, where D is a distance between the upstream edge of the sensor element 30 and the downstream end of the plates 510, W is a width of the bypass passage 21 perpendicular to the sensing surface of the sensor element 30. The anti-dust performance can be increased as the ratio D/W is decreased. Preferably, the ratio D/W is designed not greater than 2.0 since the anti-dust performance is abruptly increased below 2.0. In addition, in order to qualify the required level for the airflow meter for engine, the ratio D/W is designed not greater than 1.6. In the twenty-fifth embodiment, the ratio D/W is designed much smaller than 1.6. The flow guide member 500 may be located downstream of the sensor element.

Twenty-sixth Embodiment

Figure 54:
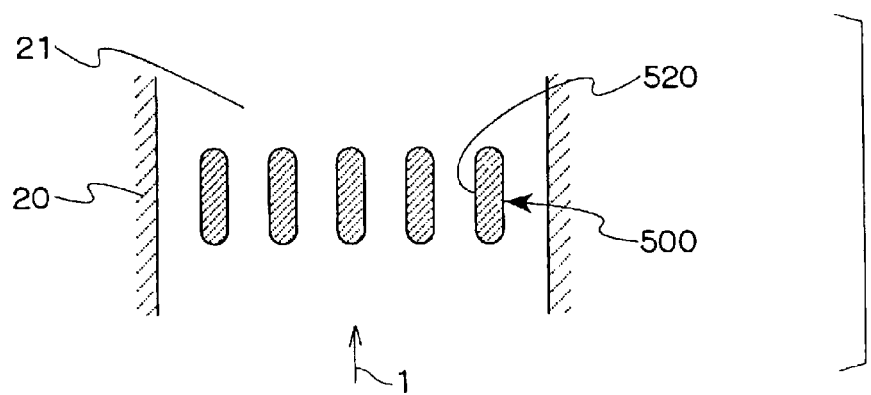
FIG. 54 is an enlarged cross sectional view of an airflow meter according to a twenty-sixth embodiment of the present invention.

FIG. 54 shows a modification of the flow guide member 500 according to a twenty-sixth embodiment. The flow guide member 500 has plates 520. Each plate 520 has rounded leading end and rounded trailing end. The rounded ends reduce eddies and improve flow guide performance.

Twenty-seventh Embodiment

Figure 55:
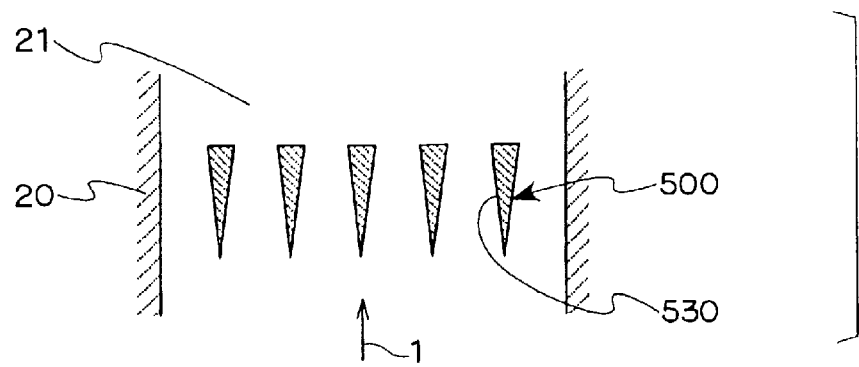
FIG. 55 is an enlarged cross sectional view of an airflow meter according to a twenty-seventh embodiment of the present invention.

FIG. 55 shows a modification of the flow guide member 500 according to a twenty-seventh embodiment. The flow guide member 500 has plates 530. Each plate 530 has a triangular cross section having inclined surfaces. The each plate 530 becomes thinner as a distance from the sensor element is increased. It is possible to reduce flow resistance. In case that the flow guide member 500 is located downstream of the sensor element, the triangular plates 530 are oriented opposite direction.

Twenty-eighth Embodiment

Figure 56:
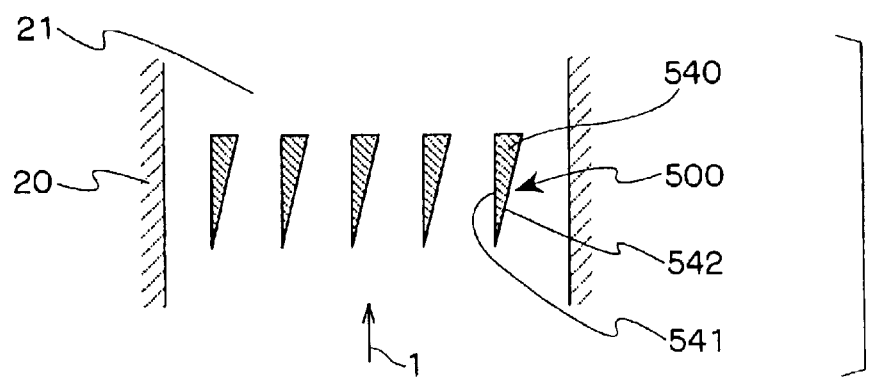
FIG. 56 is an enlarged cross sectional view of an airflow meter according to a twenty-eighth embodiment of the present invention.

FIG. 56 shows a modification of the flow guide member 500 according to a twenty-eighth embodiment. The flow guide member 500 has plates 540. Each plate 540 has a triangular cross section, and provides a parallel surface 541 and an inclined surface 542. The parallel surface 541 is formed in parallel to the airflow. The center one of the parallel surfaces 541 is aligned with the sensing surface of the sensor element 30. This arrangement also reduces the flow resistance.

Twenty-ninth Embodiment

Figure 57:
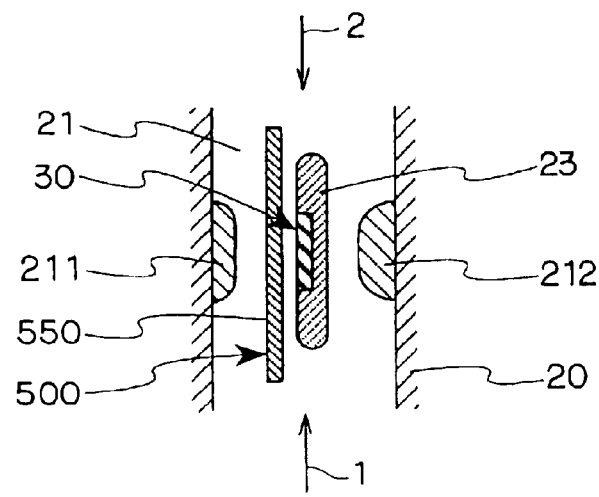
FIG. 57 is an enlarged cross sectional view of an airflow meter according to a twenty-ninth embodiment of the present invention, the view showing an arrangement on a cross section corresponding to the L—L line in FIG. 48.
Figure 58:
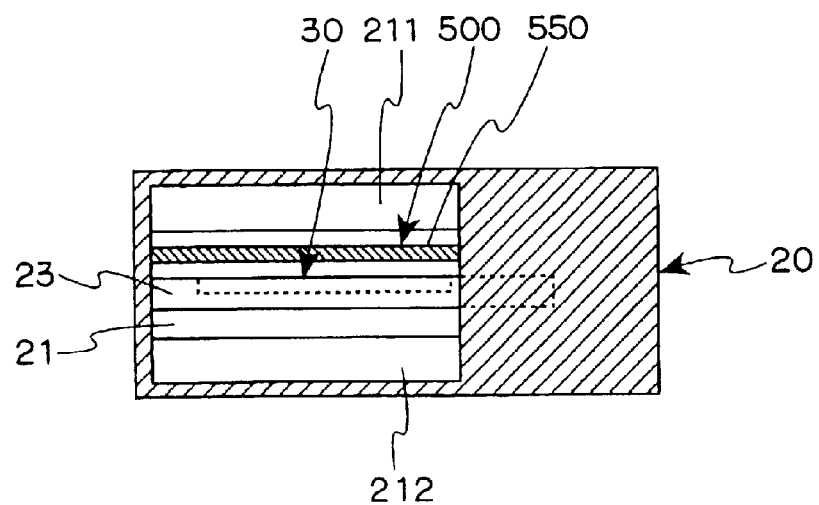
FIG. 58 is an enlarged cross sectional view of the airflow meter according to the twenty-ninth embodiment of the present invention, the view showing an arrangement on a cross section corresponding to the LI—LI line in FIG. 48.

FIGS. 57 and 58 show a modification of the flow guide member 500 according to a twenty-ninth embodiment. The flow guide member 500 has a single plate 550. The plate 550 is located between the sensor element 30 and the restricting member 211. The plate 550 is longer than the supporting member 23 in the airflow direction. The leading edge of the plate 550 is placed upstream of the leading edge of the sensor element 30 in the airflow direction. Therefore, the plate 550 guides the airflow in the forward direction 1 before it reaches to the sensor element 30. The trailing edge of the plate 550 is placed on downstream to the trailing edge of the sensor element 30 in the airflow direction. Therefore, the plate 550 guides the airflow in the reverse direction 2 before it reaches to the sensor element 30.

Thirtieth Embodiment

Figure 59:
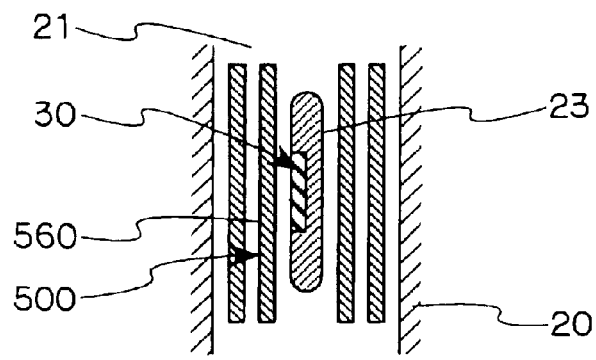
FIG. 59 is an enlarged cross sectional view of an airflow meter according to a thirtieth embodiment of the present invention, the view showing an arrangement on a cross section corresponding to the L—L line in FIG. 48.
Figure 60:
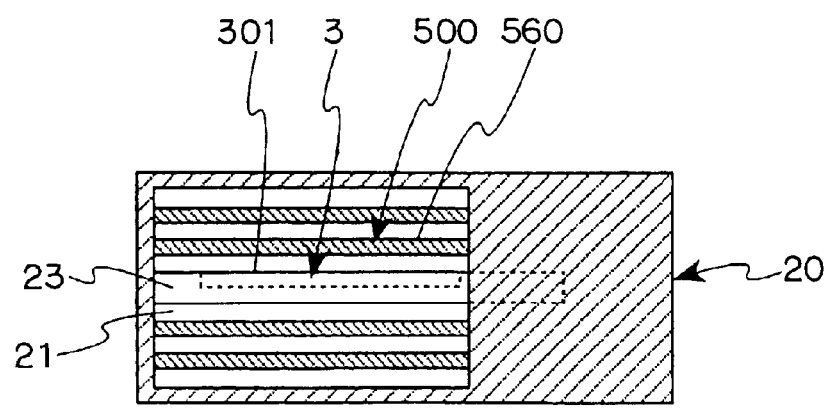
FIG. 60 is an enlarged cross sectional view of the airflow meter according to the thirtieth embodiment of the present invention, the view showing an arrangement on a cross section corresponding to the LI—LI line in FIG. 48.

FIGS. 59 and 60 show a modification of the flow guide member 500 according to a twenty-ninth embodiment. The flow guide member 500 has a plurality of plates 560. The plates 560 guide the airflow in both directions. In addition, the plates 560 works as the restricting members for restricting the passage in which the sensor element 30 is located.

Thirty-first Embodiment

Figure 61:
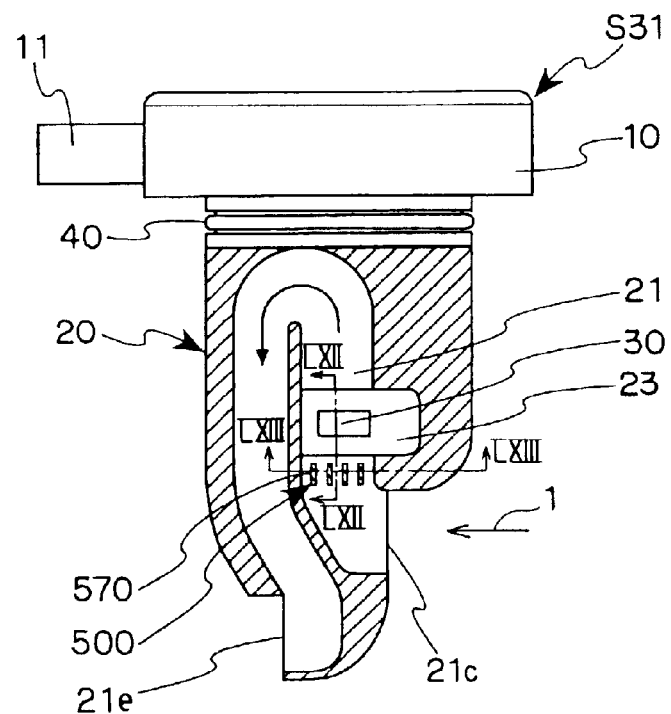
FIG. 61 is a partial cross sectional view of an airflow meter according to the thirty-first embodiment of the present invention.
Figure 62:
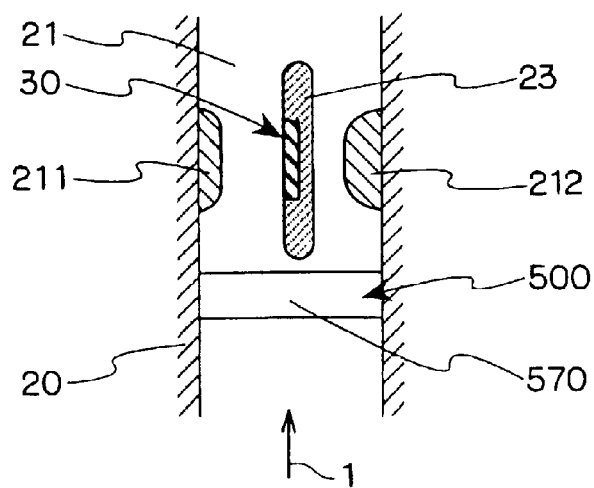
FIG. 62 is a cross sectional view of the airflow meter taken along LXII—LXII line in FIG. 61 according to the thirty-first embodiment of the present invention.
Figure 63:
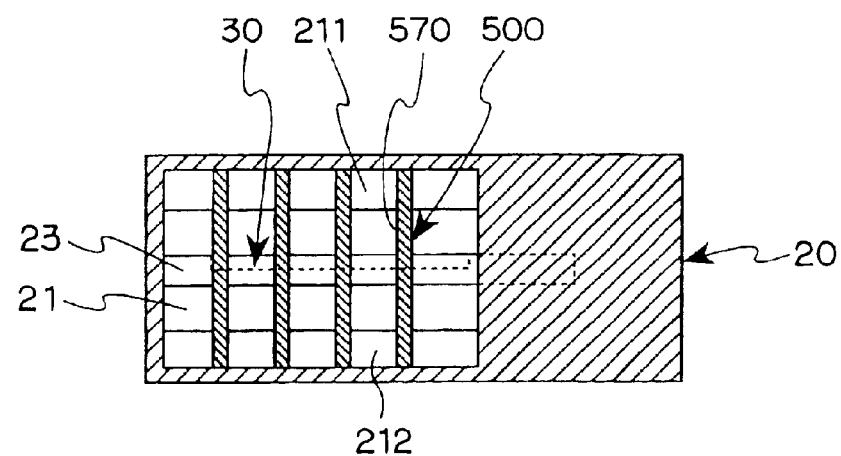
FIG. 63 is a cross sectional view of the airflow meter taken along LXIII—LXIII line in FIG. 61 according to the thirty-first embodiment of the present invention.

FIGS. 61–63 show an airflow meter S31 according to a thirty-first embodiment. The airflow meter S31 has the flow guide member 500 too. The flow guide member 500 has a plurality of plates 570. The plates 570 have flat surfaces perpendicular to the sensing surface of the sensor element 30. The flow guide member 500 protects the sensor element 30 from the dust. In this arrangement, it is preferable to locate the flow guide member 500 in the bypass passage so that the distance D and the width D satisfy the rational relationship discussed in FIG. 53.

Thirty-second Embodiment

Figure 64:
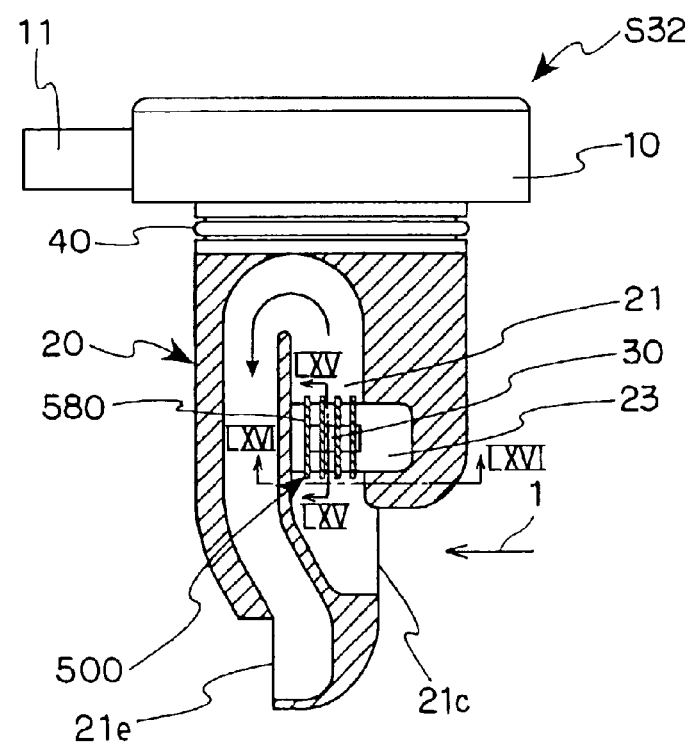
FIG. 64 is a partial cross sectional view of an airflow meter according to the thirty-second embodiment of the present invention.
Figure 65:
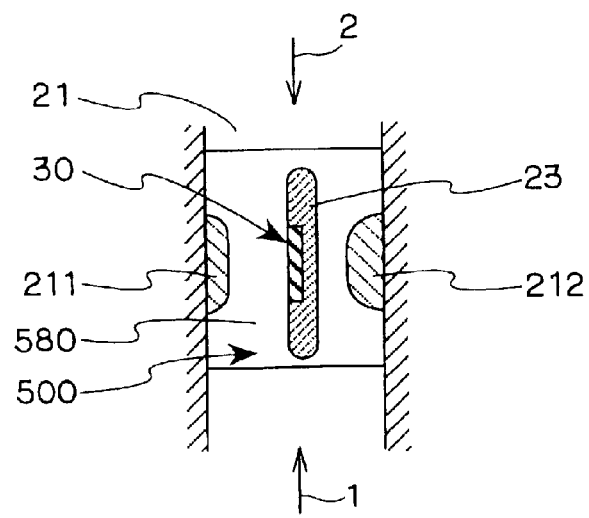
FIG. 65 is a cross sectional view of the airflow meter taken along LXV—LXV line in FIG. 64 according to the thirty-second embodiment of the present invention.
Figure 66:
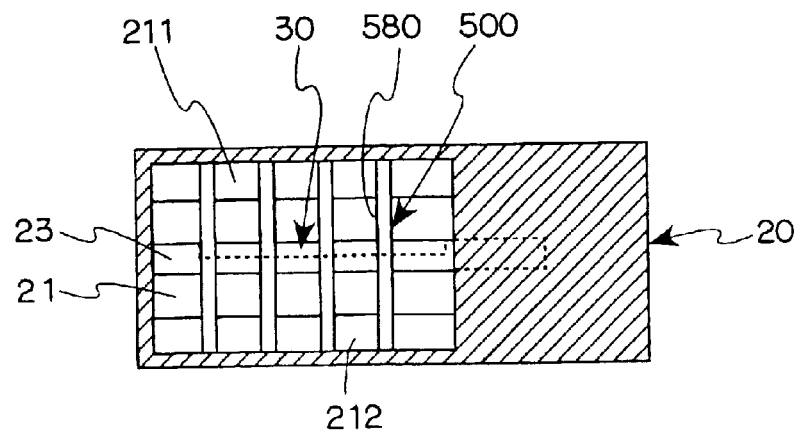
FIG. 66 is a cross sectional view of the airflow meter taken along LXVI—LXVI line in FIG. 64 according to the thirty-second embodiment of the present invention.

FIGS. 64–66 show an airflow meter S32 according to a thirty-second embodiment. The airflow meter S32 has the flow guide member 500 too. The flow guide member 500 has a plurality of plates 580. Each plate 580 has flat surfaces perpendicular to the sensing surface of the sensor element 30. The plates 580 extend longer than the support member 23 in the airflow direction. The plates 580 guide the airflow in both directions 1 and 2.

In the embodiments described in this specification, the components such as the passage member 20, the obstruction member, the deflector 5, the cover member 6 and the flow guide member 90, 500 may be made of glass fiber reinforced synthetic resin such as the PBT and the PPS, or low repulsion material such as a soft synthetic resin and an expanded resin.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An apparatus for measuring flow amount of medium, the apparatus comprising:
   a main passage in which the medium flows;
   a bypass passage for introducing a part of the medium flowing in the main passage, an inner diameter of the bypass passage being substantially constant along an entire length thereof;
   a sensor element for measuring flow amount;
   a sensing passage accommodated in the bypass passage and having an inlet for introducing the medium, the sensing passage supporting the sensor element therein; and
   an obstruction member disposed in said bypass passage, upstream of the inlet of the sensing passage, the obstruction member having a smooth surface along a flow direction of the medium and providing a projected area larger than the inlet so that the inlet is completely hidden behind the obstruction member with respect to the flow direction of the medium, said obstruction member being disposed upstream of the inlet of the sensing passage by a predetermined distance whereby air flow disrupted by said obstruction member becomes substantially steady at the inlet of the sensing passage, but dust is deflected from said inlet.

2. The apparatus according to claim 1, wherein the bypass passage defines an ejecting passage located on a portion to which the obstruction member directs the dust.

3. The apparatus according to claim 1, wherein the inlet and the obstruction member are located on the center of the bypass passage.

4. The apparatus according to claim 1, wherein the center of the inlet is shifted from the center of the obstruction member.

5. The apparatus according to claim 1, wherein the obstruction member has a circular cross section with respect to the flow direction.

6. The apparatus according to claim 1, wherein the obstruction member has a streamlined cross section with respect to the flow direction.

7. An apparatus for measuring flow amount of medium, the apparatus comprising:
   a main passage in which the medium flows in a direction;
   a bypass passage having an inlet in the main passage and introducing a part of the medium from the main passage, an inner diameter of the bypass passage being substantially constant along the entire length thereof;
   a sensor passage accommodated in the bypass passage;
   a sensor element supported in the sensor passage for measuring flow amount; and
   an obstruction member disposed upstream of the inlet of the bypass passage, the obstruction member having a smooth surface along a flow direction of the medium and providing a projected area larger than the inlet so that the inlet is completely hidden behind the obstruction member with respect to the flow direction of the medium, said obstruction member being disposed upstream of the inlet of the bypass passage by a predetermined distance whereby air flow disrupted by said obstruction member becomes substantially steady at the inlet of the bypass passage, but dust is deflected from said inlet.

8. The apparatus according to claim 7, wherein the inlet of the bypass passage and the obstruction member are located on the center of the main passage.

9. The apparatus according to claim 7, wherein the center of the inlet of the bypass passage is shifted from the center of the obstruction member.

10. An apparatus for measuring flow amount of medium, the apparatus comprising:
    a main passage in which the medium flows in a direction;
    a bypass passage having an inlet in the main passage and introducing a part of the medium from the main passage;
    a sensor element supported in the bypass passage for measuring flow amount; and
    an obstruction member disposed upstream of the inlet of the bypass passage, the obstruction member having a smooth surface along a flow direction of the medium and providing a projected area larger than the inlet so that the inlet is completely hidden behind the obstruction member with respect to the flow direction of the medium,
    wherein the obstruction member is arranged as a first obstruction member, and wherein the apparatus further comprises:
    a sensing passage disposed in the bypass passage, the sensing passage having an inlet for introducing the medium and supporting the sensor element therein; and
    a second obstruction member disposed upstream of the inlet of the sensing passage, the second obstruction member having a smooth surface along a flow direction of the medium and providing a projected area larger than the inlet so that the inlet is completely hidden behind the second obstruction member with respect to the flow direction of the medium.

11. An apparatus for measuring flow amount of medium, the apparatus comprising:
    a sensor element for measuring flow amount;
    a passage for leading the medium to the sensor element, said passage having a free inlet end; and
    an obstruction member disposed upstream of the sensor element and axially spaced in an upstream direction from said free inlet end of said passage, the obstruction member having a smooth surface along a flow direction of the medium, wherein the sensor element is completely hidden behind the obstruction member with respect to the flow direction of the medium, and said obstruction member being disposed upstream of said free inlet end of said passage by a predetermined distance whereby air flow disrupted by said obstruction member becomes substantially steady at the inlet of the passage, but dust is deflected from said inlet.

12. The apparatus according to claim 11, wherein the passage defines an ejecting passage located on a portion to which the obstruction member directs the dust.

13. The apparatus according to claim 11, wherein the sensor element and the obstruction member are located on the center of the passage.

14. The apparatus according to claim 11, wherein the center of the sensor element is shifted from the center of the obstruction member.

15. The apparatus according to claim 11, further comprising a flow guide member located upstream of the obstruction member in the passage.

16. An apparatus for measuring flow amount of medium, the apparatus comprising:
   a sensor element for measuring flow amount;
   a passage for leading the medium to the sensor element; and
   an obstruction member disposed upstream of the sensor element, the obstruction member having a smooth surface along a flow direction of the medium, wherein the sensor element is completely hidden behind the obstruction member with respect to the flow direction of the medium, wherein the passage has a restrictor portion extending from upstream of the obstruction member to the sensor element.

17. An apparatus for measuring flow amount of medium, the apparatus comprising:
   a sensor element for measuring flow amount;
   a passage for leading the medium to the sensor element; and
   an obstruction member disposed upstream of the sensor element, the obstruction member having a smooth surface along a flow direction of the medium, wherein the sensor element is completely hidden behind the obstruction member with respect to the flow direction of the medium,
   wherein a flow guide member located upstream of the obstruction member in the passage,
   wherein the passage has a restrictor portion extending from upstream of the flow guide member to the sensor element.

18. An apparatus for measuring flow amount of medium, the apparatus comprising:
   a sensor element for measuring flow amount;
   a passage for leading the medium to the sensor element;
   a first obstruction member having a smooth surface along a flow direction of the medium, the first obstruction member being disposed upstream of the sensor element so that the sensor element is completely hidden behind the first obstruction member with respect to a forward flow direction of the medium; and
   a second obstruction member having a smooth surface along a flow direction of the medium, the second obstruction member being disposed downstream of the sensor element so that the sensor element is completely hidden behind the second obstruction member with respect to a reverse flow direction of the medium.

19. The apparatus according to claim 18, further comprising flow guide members located upstream of the first obstruction member and downstream of the second obstruction member in the passage.

20. An apparatus for measuring flow amount of medium, the apparatus comprising:
   a sensor element for measuring flow amount;
   a passage for leading the medium to the sensor element, said passage having a free inlet end; and
   an obstruction member having a smooth surface along a flow direction of the medium, the obstruction member being disposed upstream of the sensor element and axially spaced in an upstream direction from said free inlet end of said passage, so that the sensor element is completely hidden behind the obstruction member with respect to a flow direction of the medium, said obstruction member being disposed upstream of said free inlet end of said passage by a predetermined distance whereby air flow disrupted by said obstruction member becomes substantially steady at the inlet of the passage, but dust is deflected from said inlet, the obstruction member being formed and located to define an inclination angle (θ) not less than 5 degrees, the inclination angle being defined between a surface of the sensor element and a tangential line (L1) on the obstruction member passing through the surface of the sensor element.

21. An apparatus for measuring flow amount of medium, the apparatus comprising:
   a sensor element for measuring flow amount;
   a passage for leading the medium to the sensor element;
   a first obstruction member having a smooth surface along a flow direction of the medium, the first obstruction member being disposed upstream of the sensor element so that the sensor element is completely hidden behind the first obstruction member with respect to a forward flow direction of the medium, the first obstruction member being formed and located to define an inclination angle (θ) not less than 5 degrees, the inclination angle being defined between a surface of the sensor element and a tangential line (L1) on the first obstruction member passing through the surface of the sensor element, and
   a second obstruction member having a smooth surface along a flow direction of the medium, the second obstruction member being disposed downstream of the sensor element so that the sensor element is completely hidden behind the second obstruction member with respect to a reverse flow direction of the medium, the second obstruction member being formed and located to define an inclination angle (θ) not less than 5 degrees, the inclination angle being defined between a surface of the sensor element and a tangential line (L1) on the second obstruction member passing through the surface of the sensor element.

22. An apparatus for measuring flow amount of medium, the apparatus comprising:
   a passage member which provides a bypass passage in the main passage;
   a sensor element disposed in the bypass passage for measuring flow amount; and
   dust preventing means for preventing dust from entering into an inlet of the bypass passage, the dust preventing means being located upstream of the inlet of the bypass passage so that a part or entirety of the inlet is hidden behind the dust preventing means.

23. The apparatus according to claim 22, wherein the dust preventing means is formed and disposed so that a part of the inlet is exposed toward upstream, and wherein the bypass passage has a perpendicular surface located downstream of the exposed part of the inlet, the perpendicular surface being perpendicular to a flow direction of the medium in the main passage.

24. An apparatus for measuring flow amount of medium, the apparatus comprising:
   a passage member which provides a bypass passage in the main passage;

a sensor element disposed in the bypass passage for measuring flow amount; and dust preventing means for preventing dust from entering into an inlet of the bypass passage, the dust preventing means being located upstream of the inlet of the bypass passage so that a part or entirety of the inlet is hidden behind the dust preventing means, wherein the dust preventing means is a louver for guiding medium away from the inlet.

25. An apparatus for measuring flow amount of medium, the apparatus comprising:

a passage member which provides a bypass passage in the main passage;

a sensor element disposed in the bypass passage for measuring flow amount; and dust preventing means for preventing dust from entering into an inlet of the bypass passage, the dust preventing means being located upstream of the inlet of the bypass passage so that a part or entirety of the inlet is hidden behind the dust preventing means, wherein the dust preventing means is a cover member which is opened perpendicularly to a flow direction of the medium in the main passage.

26. An apparatus for measuring flow amount of medium, the apparatus comprising:

a passage member which provides a bypass passage in the main passage;

a sensor element disposed in the bypass passage for measuring flow amount; and dust preventing means for preventing dust from entering into an inlet of the bypass passage, the dust preventing means being located upstream of the inlet of the bypass passage so that a part or entirety of the inlet is hidden behind the dust preventing means, wherein the passage member further defines a through hole directly from the vicinity of the inlet and the vicinity of an outlet of the bypass passage.

27. An apparatus for measuring flow amount of medium, the apparatus comprising:

a passage member which provides a bypass passage in the main passage; and a sensor element disposed in the bypass passage for measuring flow amount, wherein the bypass passage has an inlet and an outlet which are opened toward a direction perpendicular to a flow direction of the medium in the main passage, the inlet and the outlet being opened in a vicinity of a center of the main passage.

28. An apparatus for measuring flow amount of medium, the apparatus comprising:

a passage member which provides a passage in which the medium flows;

a sensor element disposed in the passage for measuring flow amount; and a flow guide member located immediately upstream of the sensor element, the flow guide member having a surface substantially parallel to the flow direction of the medium, the flow guide being formed independently from the passage member.

29. The apparatus according to claim 28, wherein the flow guide member is arranged so that the surface is parallel to a sensing surface of the sensor element.

30. The apparatus according to claim 28, wherein the passage has a rectangular cross section, and a ratio D/W is set not greater than 1.6, where D is a distance between the sensor element and the flow guide member, and W is a width of the passage.

31. The apparatus according to claim 28, wherein the flow guide member extends to a position in which the flow guide member and the sensor element face each other.

32. The apparatus according to claim 28, wherein the flow guide member has a cross section which becomes thinner as a distance from the sensor element is increased.

* * * * *